(12) United States Patent
Kondo et al.

(10) Patent No.: US 7,383,912 B2
(45) Date of Patent: Jun. 10, 2008

(54) EXHAUST PIPE STRUCTURE

(75) Inventors: Tadashi Kondo, Nishikamo-gun (JP); Junichi Yamaguchi, Toyota (JP); Katsuro Arimura, deceased, late of Toyota (JP); by Yohika Arimura, legal representative, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 601 days.

(21) Appl. No.: 10/681,095

(22) Filed: Oct. 9, 2003

(65) Prior Publication Data

US 2004/0069562 A1 Apr. 15, 2004

(30) Foreign Application Priority Data

Oct. 11, 2002 (JP) .............................. 2002-299358

(51) Int. Cl.
*B60K 13/04* (2006.01)
(52) U.S. Cl. ...................... 180/296; 180/309; 180/89.2
(58) Field of Classification Search ................ 180/309, 180/296, 89.2; 60/322, 323
See application file for complete search history.

(56) References Cited

U.S. PATENT DOCUMENTS

| | | | | |
|---|---|---|---|---|
| 1,629,235 A | * | 5/1927 | Sturt et al. ................... | 180/312 |
| 2,090,768 A | * | 8/1937 | Thomas ....................... | 180/202 |
| 2,824,619 A | | 2/1958 | Bremer et al. | |
| 3,019,847 A | * | 2/1962 | Abramson et al. ........... | 180/309 |
| 5,501,190 A | * | 3/1996 | Okubo et al. ........... | 123/196 M |
| 5,560,651 A | | 10/1996 | Kami et al. | |
| 5,813,491 A | * | 9/1998 | Sato et al. ................... | 180/309 |
| 5,961,153 A | * | 10/1999 | Foster .......................... | 285/15 |
| 6,058,702 A | * | 5/2000 | Jorg Alexnat et al. ........ | 60/322 |
| 6,158,214 A | * | 12/2000 | Kempka et al. ............... | 60/302 |
| 6,260,652 B1 | * | 7/2001 | Steenackers et al. ........ | 180/296 |

(Continued)

FOREIGN PATENT DOCUMENTS

EP 0 579 956 A1 1/1994

(Continued)

OTHER PUBLICATIONS

*Development and Research of a Purification Muffler for Exhaust Gas of Vehicle*, Chinese article, Wuhan University of Science and Technology (Natural Science Edition), vol. 23, No. 2, Jun. 2000 (with abstract).

(Continued)

*Primary Examiner*—Christopher P. Ellis
*Assistant Examiner*—Bridget Avery
(74) *Attorney, Agent, or Firm*—Kenyon & Kenyon LLP

(57) ABSTRACT

An exhaust pipe structure has, under a floor of a vehicle, an exhaust passage for exhaust gas discharged from a vehicle-installed engine, and at least one muffler is provided on an intermediate portion of the exhaust passage. The at least one muffler includes a main muffler having the greatest muffler capacity. An external cylinder forming an outer shell portion of the main muffler has a circular sectional shape having a diameter of 100 mm to 150 mm, or a sectional shape that is substantially equal to an area of the circular sectional shape. The external cylinder has a length of 800 mm to 12000 mm. The main muffler is disposed in a tunnel portion that is formed between the front wheels and the rear wheels.

17 Claims, 14 Drawing Sheets

U.S. PATENT DOCUMENTS 6,279,965 B1 * 8/2001 Kida .......................... 285/268
6,354,398 B1 3/2002 Angelo et al.

FOREIGN PATENT DOCUMENTS

| | | |
|---|---|---|
| JP | 57-134094 | 9/1981 |
| JP | 63-11234 | 1/1988 |
| JP | 02 061312 A | 3/1990 |
| JP | 5-44501 | 11/1993 |
| JP | 10 061435 A | 3/1998 |
| JP | 10 115215 A | 5/1998 |
| JP | 10 311 218 A | 11/1998 |
| JP | 11082008 A | 3/1999 |
| WO | WO 00/11328 | 3/2000 |

OTHER PUBLICATIONS

European Patent Office Communication dated Feb. 13, 2004 with attached European search report (3 pages including Abstract).
Japanese Language Version of Japanese Office Action for Appln. No. JP2002-299358 issued Jan. 9, 2007.
English Language Translation of Japanese Office Action for Appl. No. JP2002-299358 issued Jan. 9, 2007.

* cited by examiner

EXHAUST PIPE STRUCTURE

INCORPORATION BY REFERENCE

The disclosure of Japanese Patent Application No.2002-299358 filed on Oct. 11, 2002, including the specification, drawings and abstract, is incorporated herein by reference in its entirety.

BACKGROUND OF THE INVENTION

1. Field of the Invention

The invention relates to an exhaust pipe structure in which an exhaust passageway of exhaust gas discharged from a vehicle-installed engine is provided with at least one muffler (silencer).

2. Description of the Related Art

Vehicles are equipped with an exhaust apparatus for discharging exhaust gas produced in association with the operation of an engine. Such an exhaust apparatus generally adopts an exhaust pipe structure in which a catalytic converter, a subsidiary muffler, and a main muffler are disposed on an exhaust passage in that order from the engine side toward a downstream side, and adjacent components are interconnected by a small-diameter exhaust pipe (e.g., see the 4th to 5th columns and FIG. 1 in Japanese Utility Model Publication No. 5-4501). As for the components forming the exhaust pipe structure, the catalytic converter is used for purification of exhaust gas, and the subsidiary muffler and the main muffler are used to reduce the exhaust gas temperature and pressure and to reduce the exhaust noise. The subsidiary muffler is employed for the purposes of, for example, solving the problem of insufficient silencing capability of the main muffler in the case of a long exhaust passageway or the like. The main muffler normally adopted has an outer cylinder that forms an outer shell portion, and that has a large sectional area and a short length.

However, if the above-described exhaust pipe structure is applied to a low-floor vehicle, the location of installation of the main muffler is limited to a rearward portion of the vehicle. That is, the main muffler having the above-described configuration inevitably has a large sectional area and therefore a large size so as to achieve a sufficiently high silencing capability. It is difficult to install the large-size main muffler at a site other than a rearward portion of the vehicle. Thus, although the large-size main muffler can be installed a rearward portion of the low-floor vehicle in a tolerable fashion, the height of the floor of the main muffler-installed location (the rearward portion of the vehicle) cannot be reduced substantially to the same level of the floor of the other portions. Since the installation of the main muffler requires a relatively high floor level as mentioned above, it becomes difficult, for example, in the case of a low-floor sedan, to provide in a rearward portion of the vehicle a large luggage space that has a sufficiently great dimension in the vertical direction. Furthermore, in the case of a low-floor minivan equipped with a third row seat, it is difficult to provide a large third row seat-mounting space having a sufficiently great dimension in the vertical direction in a rearward portion of the vehicle. Therefore, it is difficult to provide a third row seat with spacious comfort.

In the above-described exhaust pipe structure, vibration in a vibration mode in which nodes exist in heavy components, such as the catalytic converter, the subsidiary muffler, the main muffler, etc., and loops exist in the exhaust pipe (exhaust pipe elastic resonance) occurs at about 150 to 200 Hz, due to vibration produced in association with the operation of the engine. The vibration is likely to cause concentration of stress in junctions between the heavy components and the exhaust pipe since, in the junctions, the sectional shape sharply changes. In order to prevent the stress concentration from causing deformation or the like, it is necessary to increase the strength of the junctions. Measures for increasing the strength of junctions are needed particularly if the exhaust pipe is welded to a heavy component.

SUMMARY OF THE INVENTION

It is an object of the invention to provide an exhaust pipe structure that allows a luggage space and a seat-mounting space that are sufficiently large in the vertical direction to be provided in a rearward portion of a vehicle. Another object of the invention is to provide an exhaust pipe structure that achieves the aforementioned object and that mitigates the stress concentration associated with vibration so as to eliminate the need to adopt a strength enhancement measure.

A first aspect of the invention relates to an exhaust pipe structure that has, below a floor of a vehicle, an exhaust passage for exhaust gas discharged from a vehicle-installed engine, and that has at least one muffler on an intermediate portion of the exhaust passage. The at least one muffler includes a main muffler having the greatest muffler capacity. An external cylinder forming an outer shell portion of the main muffler has a circular sectional shape having a diameter of 100 mm to 150 mm, or a sectional shape that is substantially equal to an area of the circular sectional shape, and the external cylinder has a length of 800 mm to 1200 mm. (first construction)

According to the first construction, exhaust gas produced in association with operation of the engine passes through at least one muffler during the passage through the exhaust passageway. The exhaust noise is attenuated by the muffler. The main muffler has the greatest muffler capacity among the at least one muffler. As for the external cylinder forming an outer shell of the main muffler, the diameter of the circular section is as short as 100 mm to 150 mm, and the length thereof is as long as 800 mm to 1200 mm. If the diameter of the external cylinder is less than 100 mm, it becomes difficult to secure a muffler capacity that is needed to achieve a predetermined silencing capability. If the diameter is greater than 150 mm, the main muffler becomes inconveniently large in diameter, thus making it difficult to design a low floor. If the length of the external cylinder is less than 800 mm, it become difficult to secure a muffler capacity needed to achieve a predetermined silencing capability. If the length is greater than 1200 mm, the main muffler becomes inconveniently large in length, thus making it difficult to install the main muffler under the floor.

In contrast, if the length and the diameter of the external cylinder are set within their respective ranges mentioned above, the main muffler becomes narrow and long, and it becomes possible to secure a muffler capacity needed to achieve a predetermined silencing capability. This setting prevents excessive size increase of the main muffler in the direction of diameter, and prevents installation of the main muffler under the floor from becoming difficult.

Therefore, even in the case of a low-floor vehicle with a small ground clearance, the location of installation of the muffler is not limited to a location below a luggage space in a rear portion of the vehicle. For example, the main muffler can be disposed between the front and rear wheels. Therefore, the installation of the muffler does not sacrifice the luggage space, and a luggage space that is sufficiently large in the direction of height can be provided in a rear portion of the vehicle. For example, if a third row seat is provided in a space corresponding to the luggage space, the above-described construction provides a seat-mounting space that is sufficiently large in the direction of height, in a rear portion of the vehicle.

A second aspect of the invention relates to an exhaust pipe structure that has, below a floor of a vehicle, an exhaust passage for exhaust gas discharged from a vehicle-installed engine, and that has at least one muffler on an intermediate portion of the exhaust passage. In the exhaust pipe structure, the at least one muffler includes a main muffler having the greatest muffler capacity, and an external cylinder forming an outer shell portion of the main muffler has a sectional area perpendicular to a direction of an axis of the external cylinder which is in a range of $2500\pi$ mm² to $5625\pi$ mm², and the external cylinder has a length in a range of 800 mm to 1200 mm. The $\pi$ is circular constant.

The exhaust pipe structure according to the second aspect of the invention prevents excessive size increase of the main muffler in the direction of diameter, and allows installation thereof under the floor, as in the first aspect of the invention.

An expansion muffler of the invention means an expanded type muffler.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 5 is a side view indicating a positional relationship among a main muffler, a cross member, a joint, a fuel tank, and the like;

DETAILED DESCRIPTION OF THE PREFERRED EMBODIMENTS

First Embodiment

A first embodiment of the invention will be described hereinafter with reference to FIGS. 1 to 8.

Figure 1:
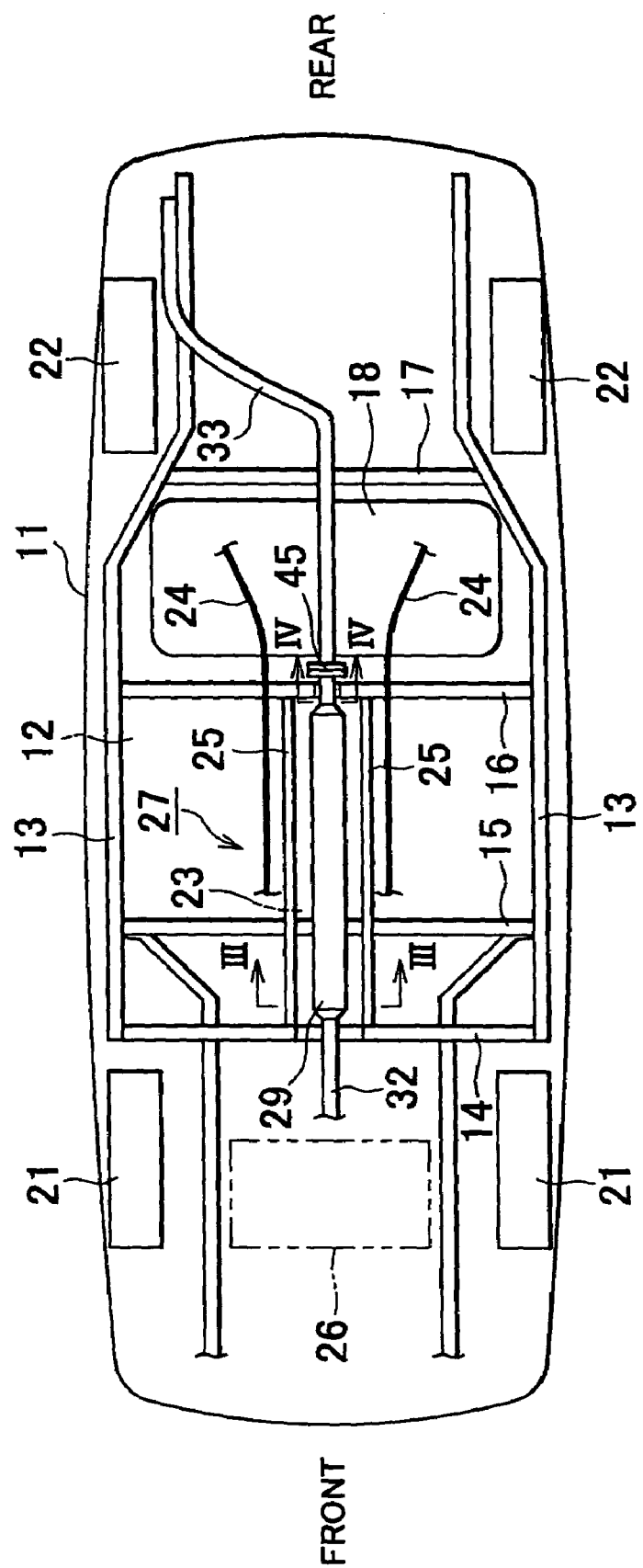
FIG. 1 is a bottom view of a structure of a lower portion of a vehicle in accordance with a first embodiment of the invention.

FIG. 1 is a schematic diagram illustrating a lower structure of a low-floor vehicle 11. In FIG. 1, the left side represents a forward side of the vehicle 11, and the right side represents a rearward side of the vehicle 11. A lower portion of the vehicle 11 has a frame and a floor 12 (see FIGS. 2 to 5). The frame includes a pair of rocker portions 13, and a plurality of cross members 14, 15, 16, 17 that extend in the transverse direction with respect to the vehicle 11 (top-bottom direction FIG. 1) and are connected to the two rocker portions 13. The forwardmost cross member 14 is located below a dashboard panel. The cross members 14 to 17 are frame members for securing strength and rigidity for the vehicle body, and each have a closed section at substantially all sites.

Figure 12:
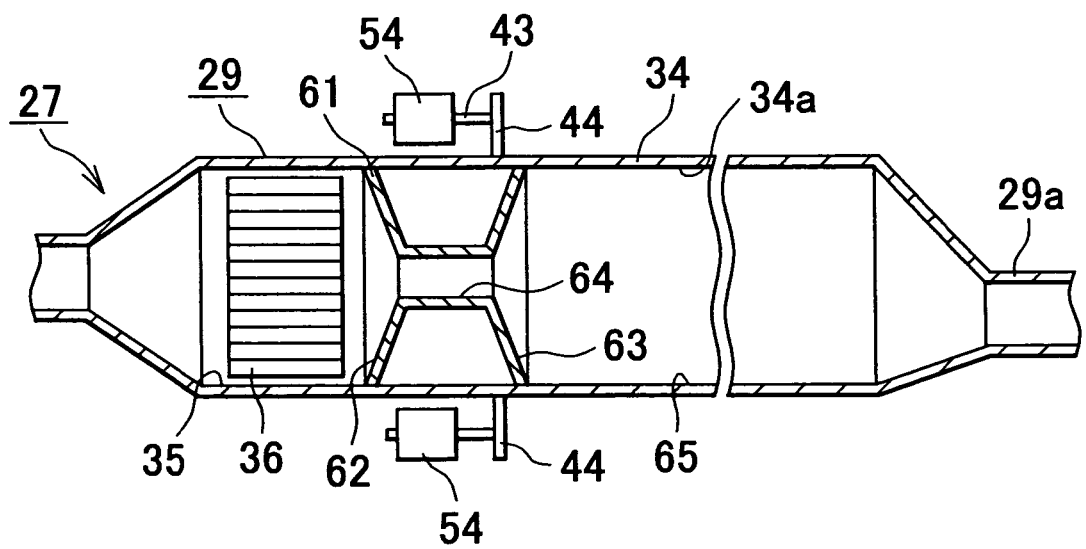
FIG. 12 is a fragmentary sectional view of an internal structure of a main muffler in a fifth embodiment.

The floor 12 is roughly divided into a front floor, a center floor, and a rear floor. FIG. 1 does not provide an illustration of the floor 12. In FIG. 12, a site (space portion) denoted by reference numeral 12 corresponds the floor 12. In the floor 12, a portion between the cross members 14, 16 generally corresponds to the front floor, and a portion between the cross members 16, 17 generally corresponds to the center floor. A portion of the floor 12 extending rearward of the cross member 17 generally corresponds to the rear floor. If the vehicle 11 is a third row seat-equipped minivan, the first row seats are disposed on the front floor, and the second row seats are disposed on the center floor, and the third row seats are disposed on the rear floor.

A fuel tank 18 is disposed in a space between the cross members 16, 17. The position of the fuel tank 18 is under the center floor. A portion of the floor 12 between front wheels 21 and rear wheels 22 has a tunnel portion 23 that extends in the longitudinal direction with respect to the vehicle 11 and is open downward. The tunnel portion 23 is formed by folding or curving a central portion of the floor 12 with respect to the transverse direction so as to protrude upward from other portions (general portion) of the floor 12 (see FIG. 3). That is, the floor 12 consists of the tunnel portion 23 and the general portion. A front end portion of the tunnel portion 23 is located near the forwardmost cross member 14. A rear end portion of the tunnel portion 23 is located near the intermediate cross member 16, that is, near a forward surface of the fuel tank 18. Thus, the fuel tank 18 is located rearward of the tunnel portion 23. The intermediate cross member 16 is located between the fuel tank 18 and a main muffler 29 described below.

Figure 3:
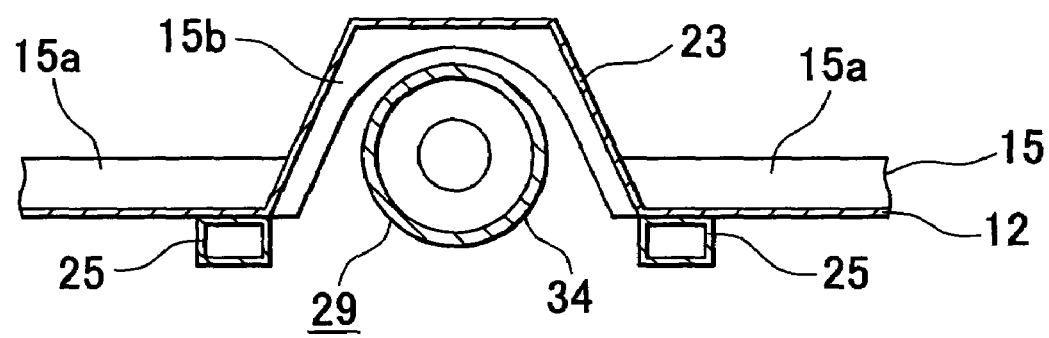
FIG. 3 is an enlarged sectional view taken on line III-III in FIG. 1.

The floor 12, more particularly, the tunnel portion 23, and the cross members 15, 16 have the following relationship. As shown in FIG. 3, the cross member 15 is made up of three parts, that is, a pair of elongated body portions 15a, and an intermediate portion 15b disposed between the two body portions 15a. The body portions 15a extend on the general portion of the floor 12, and are fixed to sides of the tunnel portion 23 by welding or the like. The intermediate portion 15b of the cross member 15 has a generally inverted "U"

shape that conforms to the shape of the tunnel portion 23. The intermediate portion 15*b* is disposed linearly with the two body portions 15*a*, and is fixed to a lower surface of the tunnel portion 23 by welding or the like.

As shown in FIG. 1, portions of parking brake cables 24 are laid near the sides of the tunnel portion 23 and along an axial direction of the tunnel portion 23, on the lower surface of the floor 12. The cables 24 mechanically connect an operating part provided near a driver's seat, such as a brake pedal, a lever or the like, and brake mechanisms (not shown) provided for the rear wheels 22. On the lower surface of the floor 12, reinforcements 25 are provided near the two sides of the tunnel portion 23, more specifically, between the tunnel portion 23 and the parking brake cables 24. The reinforcements 25 extend in the longitudinal direction along the tunnel portion 23. A front end portion of each reinforcement 25 is located on or near the cross member 14, and a rear end portion thereof is located on or near the cross member 16.

Figure 2:
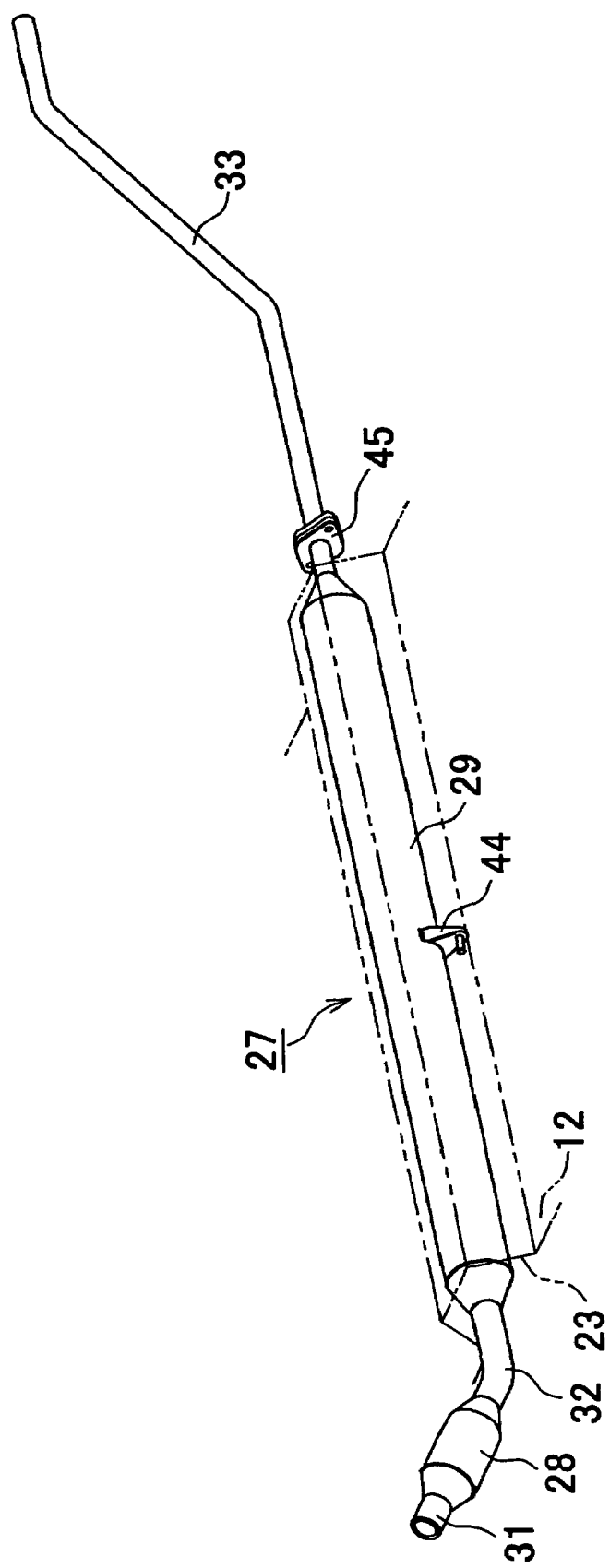
FIG. 2 is a partial perspective view of an exhaust pipe structure.

The vehicle 11 is provided with an exhaust pipe structure 27 that has an exhaust passageway for discharging exhaust gas produced in association with the operation of a vehicle-installed engine 26. As shown in FIGS. 1 and 2, the exhaust pipe structure 27 includes components, such as a start catalyst 28, a muffler (silencer), etc., that are disposed sequentially in that order from an upstream side to a downstream side of the exhaust passageway, and exhaust pipes 31, 32, 33 disposed between the components and the like. Among the exhaust pipes 31, 32, 33, the exhaust pipe located most downstream will be referred to as "downstream-side exhaust pipe 33" for distinction from the other exhaust pipes.

The start catalyst 28 is provided for promptly removing harmful components from exhaust gas immediately after a cold startup of the engine 26. In general, catalytic converters need to be warmed up to at least a predetermined temperature in order to normally function. The start catalyst 28 is disposed at a site in the exhaust passageway that is relatively close to the engine 26, so that the start catalyst 28 is quickly warmed up by exhaust gas.

Figure 4:
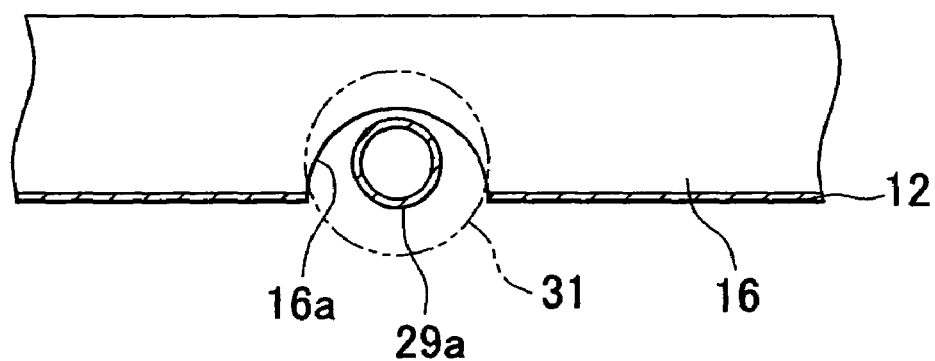
FIG. 4 is an enlarged sectional view taken on line IV-IV in FIG. 1.
Figure 5:
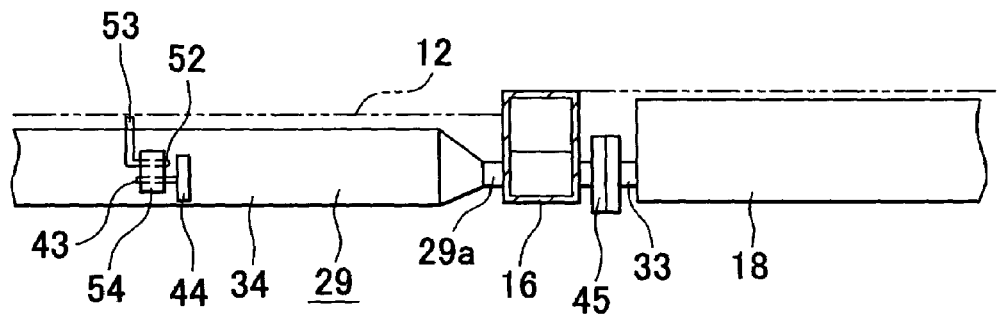

The aforementioned muffler is formed only by the main muffler 29 of an expanded type. The expanded type muffler, as well known, reduces the sound level by causing exhaust gas to flow from a narrow passageway into a large-volume space. As shown in FIG. 4, a cutout 16*a* is formed in a lower surface of the cross member 16, and receives therein a pipe portion 29*a* that extends rearward from the main muffler 29. Due to this arrangement, at least a portion of a rear end portion of the main muffler 29 is at the same height as the cross member 16 as shown in FIG. 5. That is, in an elevation view of the vehicle 11, at least a portion of the rear end portion of the main muffler 29 overlaps with the cross member 16 in the direction of height.

Figure 6:
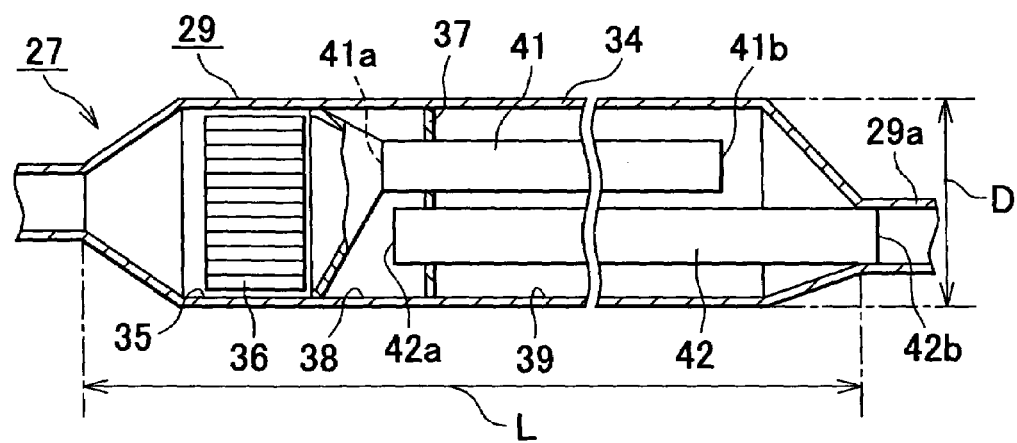
FIG. 6 is a partial sectional view of an internal structure of the main muffler.

As shown in FIG. 6, an outer shell portion of the main muffler 29 is formed by an external cylinder 34 that has a generally circular sectional shape. The diameter of a most portion of the external cylinder 34, that is, the diameter D of a thick portion of the external cylinder 34, is set within the range of 100 mm to 150 mm, and the length thereof is set within the range of 800 mm to 1200 mm. Thus, the external cylinder 34 has a narrow and elongated shape in the longitudinal direction.

If the diameter D of the external cylinder 34 is less than 100 mm, it becomes difficult to secure a muffler capacity that is needed to deliver the predetermined silencing performance, that is, a muffler capacity that is substantially equivalent to that of a conventional type muffler. The conventional type muffler is formed by a short-length subsidiary muffler having a small sectional area, and a short-length main muffler having a great sectional area. The muffler capacity for comparison is the total capacity of the subsidiary muffler and the main muffler. The muffler capacity is the volume of a space that is associated with sound attenuation. If the diameter D of the external cylinder 34 is greater than 150 mm, the main muffler 29 becomes inconveniently large in the direction of diameter. That is, in the designing of the floor 12, the effect of the main muffler 29 on the dimension in the vertical direction becomes unignorable, and it becomes difficult to realize a low-floor design.

Furthermore, if the length L of the external cylinder 34 is shorter than 800 mm, it becomes difficult to provide a muffler capacity that is needed in order to deliver a predetermined silencing performance. If the length L is greater than 1200 mm, the main muffler 29 becomes inconveniently large in the direction of length, so that it becomes difficult to attach the main muffler 29 to the floor 12.

In contrast, if the diameter D and the length L are set within the aforementioned respective ranges, it becomes possible to realize narrow and long shape of the main muffler 29 and provide a muffler capacity that is needed to achieve a predetermined silencing capability. Furthermore, the setting within the aforementioned ranges prevents excessive size increase of the main muffler in the direction of diameter, and prevents the attachment of the main muffler 29 to the floor 12 from becoming difficult.

A forward portion of the external cylinder 34 (a left-side portion in FIG. 6) has an accommodation chamber 35 in which a catalytic converter 36 is disposed. The catalytic converter 36 is a generally termed under-floor catalyst, and performs the function of removing harmful components from exhaust gas mainly during a warmed-up state of the engine 26.

If the catalytic converter 36 is provided separately from the external cylinder 34, it is often the case that the catalytic converter 36 and the external cylinder 34 are interconnected by an exhaust pipe. In contrast, in the embodiment, the catalytic converter 36 is contained in the accommodation chamber 35, that is, the catalytic converter 36 is integrated with the main muffler 29 without an intervening exhaust pipe.

The space rearward of the accommodation chamber 35 within the external cylinder 34 is divided by a separator 37 into two chambers, that is, a first expansion chamber 38 and a second expansion chamber 39. The separator 37 has holes (not shown) for communication between the two expansion chambers 38, 39. An inlet-side exhaust conduit 41 and an outlet-side exhaust conduit 42 are disposed within the external cylinder 34. An upstream end 41*a* of the inlet-side exhaust conduit 41 is communicatively connected to the accommodation chamber 35, and a downstream end 41*b* thereof is open and located in a rearward portion of the second expansion chamber 39. An upstream end 42*a* of the outlet-side exhaust conduit 42 is open and located in a portion of the first expansion chamber 38 that is near the accommodation chamber 35, and a downstream end 42*b* thereof is connected to a rearward portion of the external cylinder 34.

Figure 8:
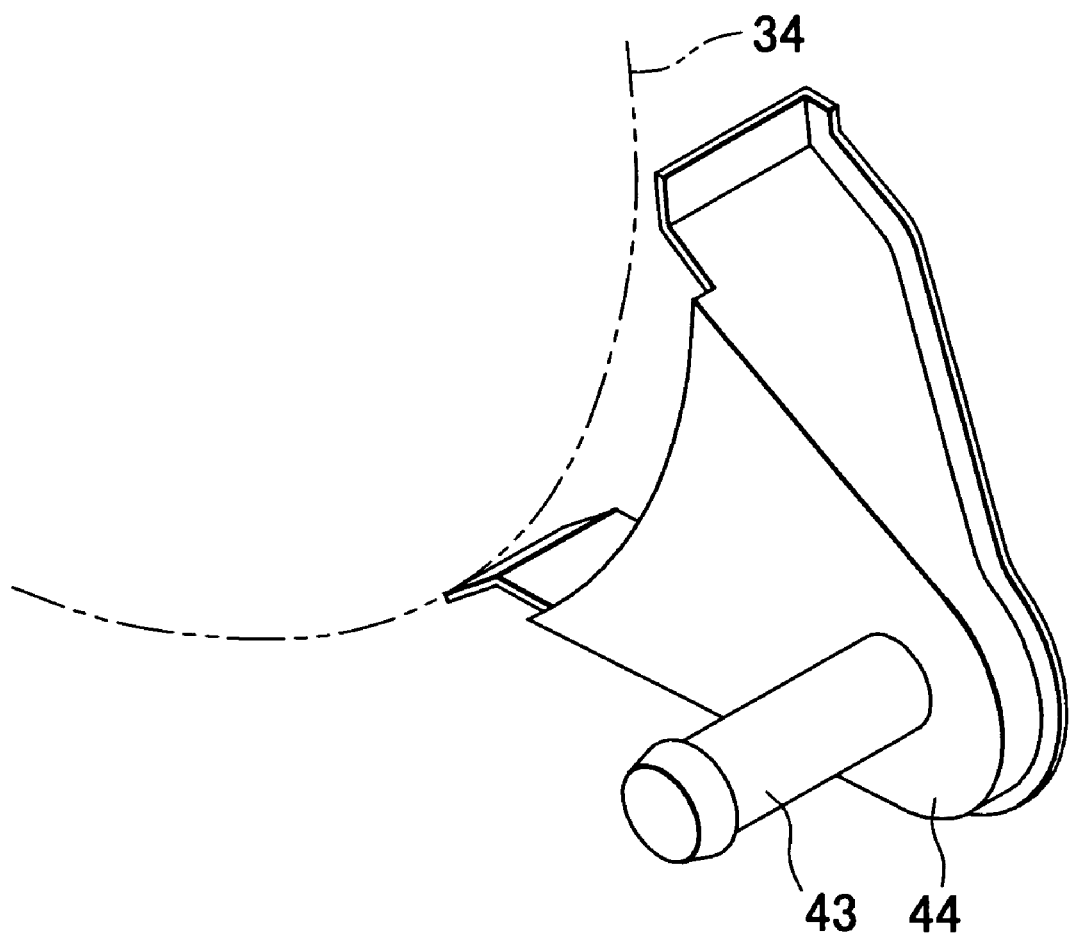
FIG. 8 is a perspective view of a bracket.

As shown in FIGS. 5 and 8, a bracket 44 having a rod-shaped hook 43 is fixed to the external cylinder 34. Via the bracket 44, the main muffler 29 is elastically supported by the floor 12, with a certain clearance from the wall surface of the tunnel portion 23. More specifically, a vehicle body-side bracket 53 having a hook 52 is fixed to the floor 12 near the tunnel portion 23. The two hooks 43, 52 are connected by a connector member 54 that is formed of an elastic material, such as rubber or the like. Via this connection, the main muffler 29 is hung from the floor 12 while extending along the axial direction of the tunnel portion 23. Elastic deformation of the connector member 54 absorbs displacement, deformation and the like caused by vibrations, heat, and the like.

As shown in FIG. 1, the forward end portion of the main muffler 29 is located in a forward portion of the tunnel portion 23, and a rearward end portion of the main muffler 29 is located in a rearward portion of the tunnel portion 23. Although in the drawings the forward and rearward portions of the external cylinder 34 are tapered, the external cylinder 34 may be shaped in other manners.

The main muffler 29 and the downstream-side exhaust pipe 33 are connected by a joint. This joint is provided between the intermediate cross member 16 and the fuel tank 18. Therefore, the cross member 16 is disposed at a position between the main muffler 29 and the joint.

In this embodiment, the joint member is a vibration absorption mechanism. The vibration absorption mechanism deforms to absorb vibrations transmitted between the main muffler 29 and the downstream-side exhaust pipe 33. Although various types of vibration absorption mechanisms exist, the embodiment employs a ball joint mechanism 45.

Figure 7:
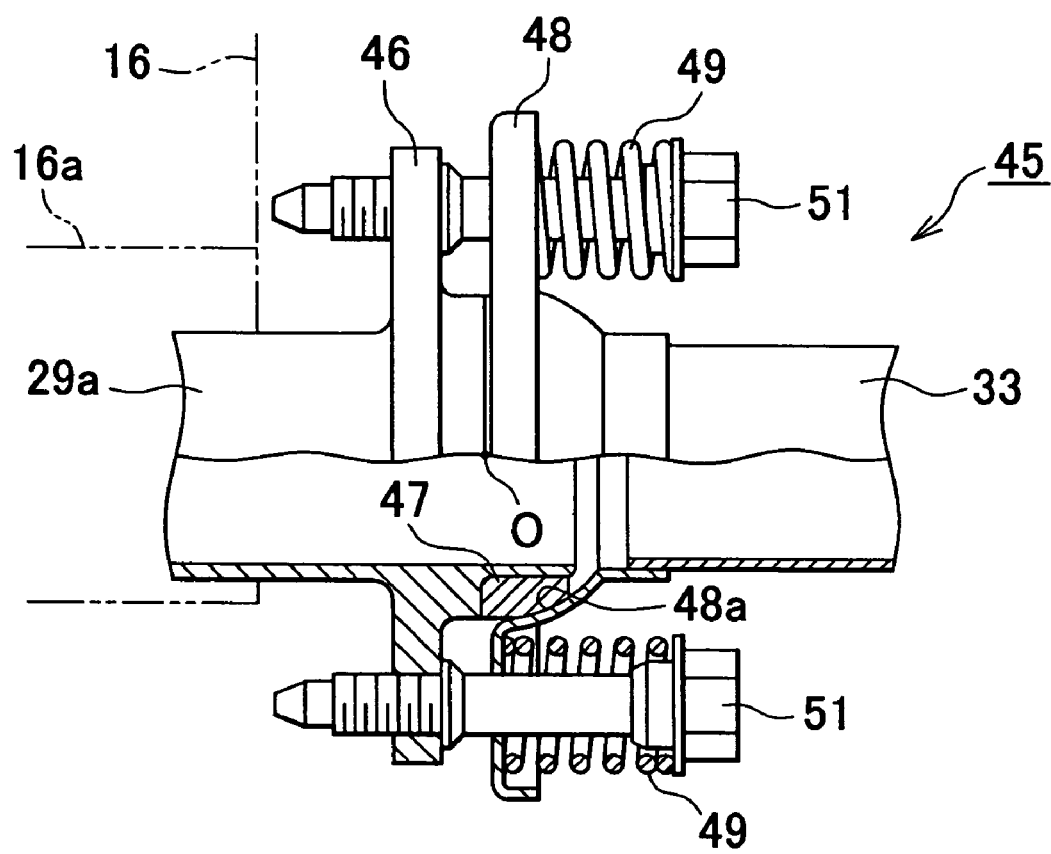
FIG. 7 is a partial cutaway side view of a ball joint mechanism.

The ball joint mechanism 45 will be described. As shown in FIG. 7, a rearward pipe portion 29a of the main muffler 29 has a flange 46, and a seal ring 47 is attached. The forward end portion of the downstream-side exhaust pipe 33 (the left end portion thereof in FIG. 7) is provided with a seal seat 48 that faces the flange 46. A portion of the seal seat 48 that faces the seal ring 47 has a spherical concave surface 48a that covers an outer peripheral surface of the seal ring 47. The flange 46 and the seal seat 48 are connected via bolts 51 each provided with a compressed coil spring 49. That is, the bolts 51 extend through the seal seat 48, and are fastened to the flange 46. A compressed coil spring 49 is provided between the head of each bolt 51 and the seal seat 48. The flange 46 and the seal seat 48 are urged in such directions as to clamp the seal ring 47 by the elastic forces of the compressed coil springs 49.

In the ball joint mechanism 45 having the above-described structure, the outer peripheral surface of the seal ring 47 contacts the concave surface 48a of the seal seat 48. Since the seal ring 47 and the seal seat 48 are slidable on each other, the pipe portion 29a of the main muffler 29 and the downstream-side exhaust pipe 33 are pivotable relatively to each other about a spherical center O of the concave surface 48a. With this structure, the ball joint mechanism 45 absorbs variations in angle associated with the connection between the main muffler 29 and the downstream-side exhaust pipe 33. Furthermore, the ball joint mechanism 45 absorbs fluctuations in the angle of the center line of the main muffler 29 and the center line of the downstream-side exhaust pipe 33. Still further, the ball joint mechanism 45 secures the sealing of the joint between main muffler 29 and the downstream-side exhaust pipe 33.

In the above-described exhaust pipe structure 27, exhaust gas produced in association with operation of the engine 26 flows sequentially though the exhaust pipe 31, the start catalyst 28, the exhaust pipe 32, the main muffler 29, the downstream-side exhaust pipe 33, etc., and then is emitted to the outside, as can be seen from FIGS. 1 and 2. It should be noted herein that the exhaust pipe structure does not have a muffler corresponding to the conventional subsidiary muffler, but has only the main muffler 29 as a muffler through which exhaust gas passes.

During a cold state of the engine 26, the harmful components in exhaust gas are substantially removed mainly during the passage of the exhaust gas through the start catalyst 28. In contrast, the harmful components in exhaust gas occurring during the warmed-up state are substantially removed during the passage through the catalytic converter 36 disposed within the main muffler 29.

As indicated in FIG. 6, after the removal of harmful components by the catalytic converter 36, exhaust gas exits from the accommodation chamber 35, and is led to a rearward portion (the second expansion chamber 39) of the external cylinder 34 via the inlet-side exhaust conduit 41. That is, the exhaust gas flows rearward through an interior of the external cylinder 34. The second expansion chamber 39 is tightly closed, except for the separator 37 disposed at the front end of the second expansion chamber 39. In addition, the upstream end 42a of the outlet-side exhaust conduit 42 is open and located in the first expansion chamber 38 forward of the separator 37. Therefore, the exhaust gas from the downstream end 41b of the inlet-side exhaust conduit 41 turns around (reverses) to the forward direction. Then, the exhaust gas flows into the first expansion chamber 38 provided forward of the separator 37, via a hole of the separator 37. After thus reaching the forward portion of the external cylinder 34, the exhaust gas flows into the outlet-side exhaust conduit 42 via the upstream end 42a. The exhaust gas then flows through the outlet-side exhaust conduit 42, that is, the exhaust gas has turned around (reversed) to the rearward direction. After being led to the rear portion of the external cylinder 34 via the outlet-side exhaust conduit 42, the exhaust gas is let out into the downstream-side exhaust pipe 33. The sectional area of passageway of exhaust gas increases at the time of flow from the inlet-side exhaust conduit 41 into the second expansion chamber 39 and the time of entrance from the separator 37 into the second expansion chamber 39. The expansion of exhaust gas due to the increase in the sectional area of passageway involves a drop in the pressure of exhaust gas, so that the overall pressure of sound (i.e., pressure waves) drops and the sound volume of exhaust noise attenuates.

The exhaust gas from the inlet-side exhaust conduit 41 flows in the first expansion chamber 38 before entering the outlet-side exhaust conduit 42. At this time, the exhaust gas contacts a wall of the accommodation chamber 35, and heat is transferred from the exhaust gas to the catalytic converter 36 via the wall and the like. Due to this heat transfer, the catalytic converter 36 is warmed up, and the catalyst temperature is substantially prevented from decreasing.

During passage of exhaust gas through the main muffler 29, a portion of heat from the exhaust gas is released from the external cylinder 34 toward the fuel tank 18, as can be understood from FIG. 5. The cross member 16 also functions as a heat shield. That is, the cross member 16 disposed between the main muffler 29 and the fuel tank 18 blocks propagation of heat.

Likewise, while exhaust gas is passing through the main muffler 29, a portion of heat from the exhaust gas is released from the external cylinder 34 toward the sides of the tunnel portion 23. The reinforcement members 25 also function as a generally termed heat shield members. That is, the reinforcement members 25 block propagation of heat from the main muffler 29 to component parts disposed at the sides of the tunnel portion 23.

The exhaust pipes 31 to 33 have a smaller sectional area than the catalyst temperature 36 and the main muffler 29. Therefore, if the exhaust pipe is used to connect the catalytic converter 36 and the main muffler 29, a small-sectional area portion exists between the catalytic converter 36 and the main muffler 29, resulting in a relatively low rigidity. In contrast, in the first embodiment, the catalytic converter 36 is provided integrally with the main muffler 29. That is, the embodiment eliminates such a small-sectional area portion as the one formed in a structure where an exhaust pipe is used for the connection between the two components. Therefore, the first embodiment achieves greater rigidity than the structure where the catalytic converter 36 and the main muffler 29 are interconnected by an exhaust pipe.

In some cases, vibration produced in association with operation of the engine 26 causes vibration in a vibration mode in which nodes exist in heavy weight components, such as the main muffler 29, the start catalyst 28 and the like, and loops exist in the exhaust pipes 31 to 33. If a junction portion between an exhaust pipe and a heavy component has a sharply changing sectional shape, the aforementioned vibration is likely to cause concentrated stress. However, the first embodiment does not employ a component corresponding to the conventional subsidiary muffler, and therefore has a correspondingly reduced number of junction portions between an exhaust pipe and a heavy weight component, that is, a reduced number of portions having a sharply changing sectional shape. Thus, the first embodiment has a reduced number of sites where concentrated stress is likely to be caused by vibration.

The vibration transmitted from the main muffler 29 to the downstream-side exhaust pipe 33 or in the opposite direction is absorbed or reduced by deformation of the ball joint mechanism 45 shown in FIG. 7. Specifically, in the ball joint mechanism 45, the seal ring 47 and the concave surface 48a of the seal seat 48 are slidable on each other, and therefore, the main muffler 29 and the downstream-side exhaust pipe 33 are pivotable relative to each other about the spherical center O of the concave surface 48a. The relative pivot absorbs vibration transmitted between the main muffler 29 and the downstream-side exhaust pipe 33.

If the ball joint mechanism 45 is disposed in an intermediate portion of the downstream-side exhaust pipe 33, that is, if the ball joint mechanism 45 is disposed between an exhaust pipe and another exhaust pipe, there is a possibility that sufficiently high performance of vibration absorption will not be delivered. That is, a portion (exhaust pipe) located upstream of the ball joint mechanism 45 and a portion (exhaust pipe) located downstream of the ball joint mechanism 45 have only a small weight difference. Therefore, if vibration is transmitted to one of the two portions, the two portions move together. In contrast, in the first embodiment, the heavy-weight main muffler 29 forms a portion upstream of the ball joint mechanism 45, and the light-weight downstream-side exhaust pipe 33 forms a portion downstream of the ball joint mechanism 45. Thus, the weight difference between the two components is great. Therefore, if vibration propagates from a downstream side to an upstream side, and moves the downstream-side exhaust pipe 33, the main muffler 29 remains substantially still, or does not significantly move.

If an impact occurs on the vehicle 11 from a side, the load caused by the impact is received and borne by the main muffler 29 disposed within the tunnel portion 23 as indicated in FIG. 3. The rigidity of the tunnel portion 23 is enhanced by the reinforcements 25 extending near the sides of the tunnel portion 23 and along the axial direction of the tunnel portion 23. Therefore, if a sideway impact occurs on the vehicle 11, the load caused by the impact is received and borne by the main muffler 29 and the reinforcements 25.

If an impact occurs on the vehicle 11 from the rear, the impact is received and borne by the cross member 16 positioned forward of the ball joint mechanism 45 as shown in FIGS. 5 and 7. That is, if an impact occurs on the vehicle 11 from the rear and a load acts on the exhaust pipe structure 27 in a forward direction, the load is received and borne by the ball joint mechanism 45 contacting the cross member 16. Thus, the transmission of vibration to the main muffler 29 is substantially prevented.

The first embodiment achieves the following advantages.

(1) The external cylinder 34 is provided with an elongated narrow shape, by setting the diameter D of the circular section of the external cylinder 34 within the range of 100 mm to 150 mm, and setting the length L of the external cylinder 34 within the range of 800 mm to 1200 mm. Therefore, although a subsidiary muffler is not employed, it is possible to secure a muffler capacity needed for predetermined silencing performance, to prevent excessively great diameter of the main muffler 29, and to prevent the mounting of the exhaust pipe structure to the floor 12 from becoming difficult.

Therefore, even in the low-floor vehicle 11 having only a small clearance from ground, the location of installation of the muffler is not limited to a rearward lower portion of the vehicle 11, but the main muffler 29 can be disposed between the front wheels 21 and the rear wheels 22 as shown in FIG. 1. If the vehicle 11 is a low-floor sedan, the luggage space is not reduced for installation of the muffler, but a luggage space that is sufficiently large in the vertical direction can be provided in a rear portion of the vehicle 11. In the case of a third row seat-equipped low-floor minivan, a seat-mounting space that is sufficiently large in the vertical direction can be provided in a rear portion of the vehicle 11.

(2) Since the main muffler 29 has an elongated narrow shape, the diameter of the tunnel portion 23 can be reduced corresponding to the diameter of the main muffler 29. Due to the reduced diameter of the tunnel portion 23, the upward protrusion of the tunnel portion 23 in the floor 12 is reduced. As a result, the occupant foot space can be increased, for example, for the second row seats.

In particular, the front end portion of the main muffler 29 is positioned in a front portion of the tunnel portion 23. Therefore, the main muffler 29 has a greater length in the embodiment than in a case where the position of the front end portion of the main muffler is changed to an intermediate portion of the tunnel portion 23 while the position of the rear end portion of the main muffler remains unchanged. Correspondingly to the increased length, the diameter of the main muffler 29 can be reduced while a necessary muffler capacity is maintained. This is effective in reducing the diameter of the tunnel portion 23.

(3) In comparison with a muffler arrangement formed by a main muffler and a subsidiary muffler, a muffler arrangement formed only by the main muffler 29 reduces the number of junctions between the exhaust pipes 31 to 33 and heavy weight components, and reduces the number of sites where the sectional shape sharply changes. Therefore, this arrangement reduces the number of sites of stress caused by vibration at about 150-200 Hz in a vibration mode in which nodes exist in the main muffler 29 and loops exist in the exhaust pipe due to vibration produced in association with operation of the engine 26. Hence, the number of sites that need a measure for enhancing the rigidity can be correspondingly reduced.

(4) In general, expanded type mufflers deliver higher silencing performance than straight mufflers of a sound absorption type, a resonance type, etc. Since the first embodiment employs an expanded type muffler as the main muffler 29, the first embodiment is able to efficiently attenuate exhaust noise. The resonance type muffler reduces the volume of sound due to cancellation caused by opposite-phase sound waves that occur when sounds resonate in the expanded chamber. The sound absorption type muffler reduces the sound volume of exhaust by causing exhaust gas to pass through a great surface-area component, such as a flocculent glass fiber or the like, whereby friction is produced and kinetic energy of sound waves, that is, pressure waves, is converted into thermal energy, and the sound waves are attenuated.

(5) The main muffler 29 is disposed within the tunnel portion 23 extending in the longitudinal direction relative to the vehicle 11. Therefore, if an impact occurs on the vehicle 11 in a sideway direction, the load caused by the impact is received and borne by the main muffler 29, so that inward deformation of the tunnel portion 23 can be substantially prevented.

(6) The reinforcements 25 are disposed near the sides of the tunnel portion 23, on the lower surface of the floor 12. Therefore, if an impact occurs on the vehicle 11 from a side, the load caused by the impact is received and borne by the reinforcements 25 in addition to the main muffler 29 mentioned in the above paragraph (5). Hence, the deformation of the tunnel portion 23 caused by load can be more reliably prevented.

(7) When exhaust gas passes through the main muffler 29, a portion of heat of the exhaust gas is released from the main muffler 29. In particular, the expanded muffler allows easy heat transfer, and allows easy heat dissipation from the external cylinder 34, compared with the straight type muffler (the sound absorption type, the resonance type, etc.).

In the first embodiment, the cross member 16 is disposed between the main muffler 29 and the fuel tank 18 as shown in FIG. 5, so as to function as a heat shield. Therefore, the first embodiment prevents an undesired event that heat released from the external cylinder 34 of the main muffler 29 is transferred to the fuel tank 18 and the fuel tank 18 receives adverse effect of heat (heat damage). This arrangement eliminates the need to provide a separate component for blocking heat, and therefore makes it possible to reduce the number of component parts.

Furthermore, the expanded type main muffler 29 more readily releases heat than the sound absorption type and the resonance type, as mentioned above. Correspondingly, the amount of heat released from the components (downstream-side exhaust pipe 33) located downstream of the main muffler 29 is reduced. Therefore, the effect of heat released from the downstream-side exhaust pipe 33 on other components (the fuel tank 18, the floor, the rear suspension, etc.) does not become a problem, and it is unnecessary to take a measure for reducing the effect, for example, provide a heat shield plate for reducing the heat damage.

(8) In the first embodiment, the reinforcements 25 are provided near the sides of the tunnel portion 23 and along the axial direction of the tunnel portion 23 on the lower surface of the floor 12 as indicated in FIG. 3, as mentioned in the above-paragraph (7). The reinforcements 25 block heat transfer from the main muffler 29 to components disposed at sides of the tunnel portion 23, for example, the parking brake cables 24. As a result, the first embodiment substantially prevents an undesired event that heat from the main muffler 29 causes adverse effect (heat damage) on a component part disposed at a side of the tunnel portion 23. This arrangement eliminates the need to separately provide a component for blocking heat, and is effective in reducing the number of component parts.

(9) As shown in FIG. 5, the cross member 16 is disposed between the main muffler 29 and the joint. Therefore, if an impact acts on the vehicle 11 from rear and the joint is displaced forward, the joint is received and stopped by the cross member 16, so that the transfer of load caused by the impact to the main muffler 29 can be curved. Therefore, the deformation caused by impact can be substantially contained in the portion (downstream-side exhaust pipe 33) downstream of the joint, and the deformation of main muffler 29 can be substantially prevented.

(10) As a joint, a vibration absorbing mechanism (ball joint mechanism 45) is provided between the main muffler 29 and the downstream-side exhaust pipe 33 as shown in FIG. 7. The portion upstream of the vibration absorbing mechanism is formed by the heavy-weight main muffler 29, and the portion downstream thereof is formed by the light-weight downstream-side exhaust pipe 33. Thus, there is a great weight difference between the two portions. Therefore, even if the downstream-side exhaust pipe 33 is moved due to the vibration transmitted from a downstream side toward an upstream side, the main muffler 29 can be substantially prevented from moving. Therefore, the vibration absorbing mechanism becomes more apt to deform, and the vibration absorbing capability can be improved.

(11) As shown in FIGS. 1, 4 and 5, the main muffler 29 is positioned forward of the cross member 16, and the height-direction position of the main muffler 29 is set such that at least a portion of the rear end portion of the main muffler 29 is at the same height as the cross member 16. In this manner, the rear end portion of the main muffler 29 overlaps at least partially with the cross member 16 in the direction of height. Therefore, if an impact acts on the vehicle 11 from front so that a force acts on the exhaust pipe structure 27 in the rearward direction, the load can be received and borne by the cross member 16 due to the contact between the cross member 16 and the main muffler 29. As a result, this arrangement substantially prevents an undesired event that the main muffler 29 heated to high temperature due to passage of exhaust gas has direct contact with the fuel tank 18, and therefore has adverse effect (heat damage) on the fuel tank 18.

(12) The catalytic converter 36 is provided integrally with the main muffler 29 without an intervening exhaust pipe. Therefore, there is not such a small-sectional area portion as the one formed in the case where the catalytic converter 36 and the main muffler 29 are connected via an exhaust pipe, and therefore the rigidity increases. As a result, the catalytic converter 36 and the main muffler 29 can be made more resistant to bending, twisting, etc., and can be made less prone to being deformed. Furthermore, since the catalytic converter 36 is disposed within the accommodation chamber 35 in the external cylinder 34, integration of the catalytic converter 36 and the main muffler 29 can be realized by a simple construction.

(13) As for the main muffler 29, the upstream end 41a of the inlet-side exhaust conduit 41 is connected to the accommodation chamber 35, and the downstream-side open end 41b thereof is located in a rear portion of the external cylinder 34 as shown in FIG. 6. The upstream-side open end 42a of the outlet-side exhaust conduit 42 is located near the accommodation chamber 35, and the downstream end 42b thereof is connected to a rear portion of the external cylinder 34. Therefore, when exhaust gas flows from the inlet-side exhaust conduit 41 into the second expansion chamber 39, the sectional area of exhaust passage is increased, so that the exhaust gas is expanded and the exhaust noise is attenuated.

Furthermore, in the main muffler 29, the external cylinder 34, forming a portion of the accommodation chamber 35, is in contact with external air. Therefore, there is a tendency of delay of temperature rise of the catalytic converter 36. However, when exhaust gas, after flowing from the inlet-side exhaust conduit 41 into the first expansion chamber 38, flows into the outlet-side exhaust conduit 42, heat of the exhaust gas can be transferred to the catalytic converter 36 via the wall of the accommodation chamber 35 or the like. Due to the heat transfer, the catalytic converter 36 is warmed so as to curb decrease in the catalyst temperature and therefore curb degradation in the emission control performance. Furthermore, the catalyst temperature can be quickly raised, and therefore, the emission control performance of the catalyst can be quickly enhanced.

Second Embodiment

Figure 9:
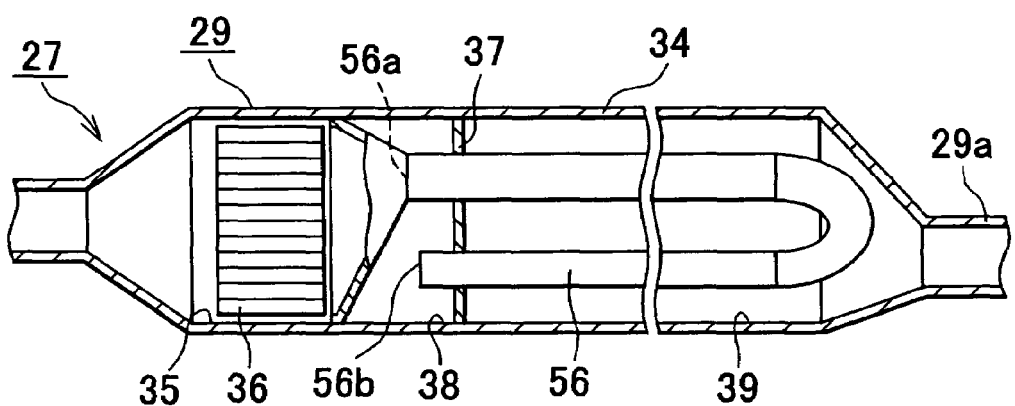
FIG. 9 is a fragmentary sectional view of an internal structure of a main muffler in a second embodiment.

A second embodiment of the invention will be described with reference to FIG. 9. In the second embodiment, an exhaust conduit 56 is disposed within an external cylinder 34. The exhaust conduit 56 has a length that is approximately twice the length of a portion of the exhaust cylinder 34 that excludes an accommodation chamber 35 (i.e., expansion chambers 38, 39), and an intermediate portion of the exhaust conduit 56 is bent so as to form a generally letter-U shape. An upstream end 56a of the exhaust conduit 56 is communicatively connected to the accommodation chamber 35. A downstream end 56b of the exhaust conduit 56 is open and is located in the first expansion chamber 38, near the accommodation chamber 35. An intermediate portion of the exhaust conduit 56 is located in a rear portion of the second expansion chamber 39. The exhaust conduit 56 has a shape that can be formed by connecting the downstream end 41b of the inlet-side exhaust conduit 41 and the downstream end 42b of the outlet-side exhaust conduit 42 in the embodiment via a U-shaped pipe. Except for the above-described construction, the second embodiment has substantially the same construction as the first embodiment. Therefore, components of the second embodiment comparable to those of the first embodiment are represented by comparable reference characters in FIG. 9, and are not described in detail again.

According to the above-described exhaust pipe structure 27, the exhaust gas that has passed through the catalytic converter 36 and therefore has been subjected to exhaust gas purification process flows from the accommodation chamber 35 into the exhaust conduit 56. After being led via the exhaust conduit 56 to the rear portion of the external cylinder 34, the exhaust gas is turned around in direction in the rear portion, and is then led toward a front portion of the external cylinder 34 via the exhaust conduit 56. After flowing out of the downstream end 56b of the exhaust conduit 56 and entering the first expansion chamber 38 formed forward of the separator 37, the exhaust gas moves into the second expansion chamber 39 formed rearward of the separator 37, via holes of the separator 37. Thus, during this passage, the exhaust gas changes its direction again. After flowing rearward in the second expansion chamber 39, the exhaust gas is led out into the downstream-side exhaust pipe 33. Thus, the sectional area of exhaust passage increases when exhaust gas moves from the exhaust conduit 56 into the first expansion chamber 38, and when exhaust gas moves from the separator 37 into the second expansion chamber 39. Due to the expansion and reduction of exhaust gas caused by the increase in sectional area, the exhaust noise is attenuated.

Furthermore, since the open downstream end 56b of the exhaust conduit 56 is located near the accommodation chamber 35, the exhaust gas flowing forward from the downstream end 56b contacts the rear wall of the accommodation chamber 35, so that heat of the exhaust gas is transferred to the catalytic converter 36 via the rear wall and the like. This heat transfer warms the catalytic converter 36, and curbs decease in the catalyst temperature.

Therefore, the second embodiment achieves the following advantages, in addition to the above-stated advantages (1) to (12).

(14) The upstream end 56a of the exhaust conduit 56 disposed in the external cylinder 34 is connected to the rear wall of the accommodation chamber 35, and the downstream end 56b thereof is open and is located near the accommodation chamber 35. Therefore, when exhaust gas flows out of the exhaust conduit 56 or the like, the sectional area of exhaust passage is increased so as to expand the exhaust gas and attenuate the exhaust noise. Furthermore, heat of the exhaust gas flowing out of the exhaust conduit 56 is transferred to the catalytic converter 36 via the rear wall of the accommodation chamber 35 and the like, so as to warm the catalytic converter 36 and curb decrease in the catalyst temperature. Therefore, the second embodiment is able to curb decrease in the emissions control performance associated with decrease in the catalyst temperature similarly to the first embodiment, although the second embodiment is different in construction from the first embodiment. Furthermore, the second embodiment is able to quickly raise the catalyst temperature and quickly enhance the emissions control performance of the catalyst.

Third Embodiment

Figure 10:
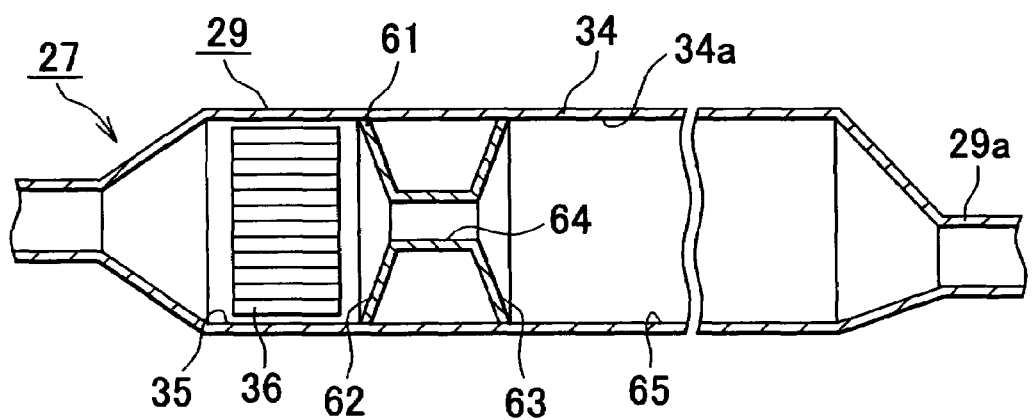
FIG. 10 is a fragmentary sectional view of an internal structure of a main muffler in a third embodiment.

A third embodiment of the invention will be described with reference to FIG. 10. In the third embodiment, a separator 61 formed by a hollow annular body is fitted to an inner wall surface 34a of an external cylinder 34 so that an axial direction of separator 61 is same as an axial direction of the external cylinder 34. The separator 61 is fixed to the inner wall surface 34a by welding or the like. The space within the external cylinder 34 is divided by the separator 61 into a forward-side accommodation chamber 35 and a rearward-side expansion chamber 65. The accommodation chamber 35 contains a catalytic converter 36 as in the first embodiment. An upstream-side wall surface 62 of the separator 61 is an inclined surface in which points located further downstream are progressively closer to the center. In this embodiment, the upstream-side wall surface 62 has a taper shape that decreases in diameter toward a downstream side. In the third embodiment, a downstream-side wall surface 63 of the separator 61 has a taper shape that decreases in diameter toward an upstream side. The accommodation chamber 35 and the expansion chamber 65 are interconnected in communication via a central hole 64 of the separator 61 (hereinafter, referred to as "central hole portion"). Except for the above-described features, the third embodiment has substantially the same construction as the first embodiment. Components of the third embodiment comparable to those of the first embodiment are represented by comparable reference characters in the FIG. 10, and are not described in detail again.

According to the above-described exhaust pipe structure 27, when the exhaust gas that has passed through the catalytic converter 36 and therefore has been subjected to an exhaust gas purification process flows out of the accommodation chamber 35, the exhaust gas passes through the separator 61. During this passage, the exhaust gas is concentrated toward the central hole portion 64 by the tapered upstream-side wall surface 62. After passing through the central hole portion 64, the exhaust gas flows into the expansion chamber 65. Then, the exhaust gas flows rearward in the external cylinder 34, and is let out into the downstream-side exhaust pipe 33 via a pipe 29a of the main muffler 29. When exhaust gas moves from the central hole portion 64 into the expansion chamber 65, the sectional area of exhaust passage increases, so that expansion of exhaust gas attenuates the exhaust noise. Thus, the separator 61 reduces the noise of exhaust gas by changing the sectional area of exhaust passage. In addition to this silencing effect, the separator 61 achieves a flow smoothing effect of concentrating exhaust gas along the upstream-side wall surface 62 toward a central portion of the external cylinder 34 and thus causing smooth flow.

Therefore, according to the third embodiment, the following advantages can be achieved in addition to the aforementioned advantages (1) to (12).

(15) The separator 61 formed by a hollow annular body is provided along the inner wall surface 34a of the external cylinder 34. Due to the adoption of the hollow annular body, the separator has an increased rigidity, so that the strength of the main muffler 29 will increase and the shock (or vibration) resistance will improve.

(16) At least the upstream-side wall surface 62 of the separator 61 is tapered so that the diameter thereof decreases toward a downstream side. Therefore, the separator 61 achieves a flow smoothing effect in addition to the silencing effect. The separator 61, being a single component, accomplishes the exhaust gas flow smoothing effect and the silencing effect. Therefore, the number of component parts required is less than in a case where separate members are used to achieve the flow smoothing effect and the silencing effect.

Fourth Embodiment

Figure 11:
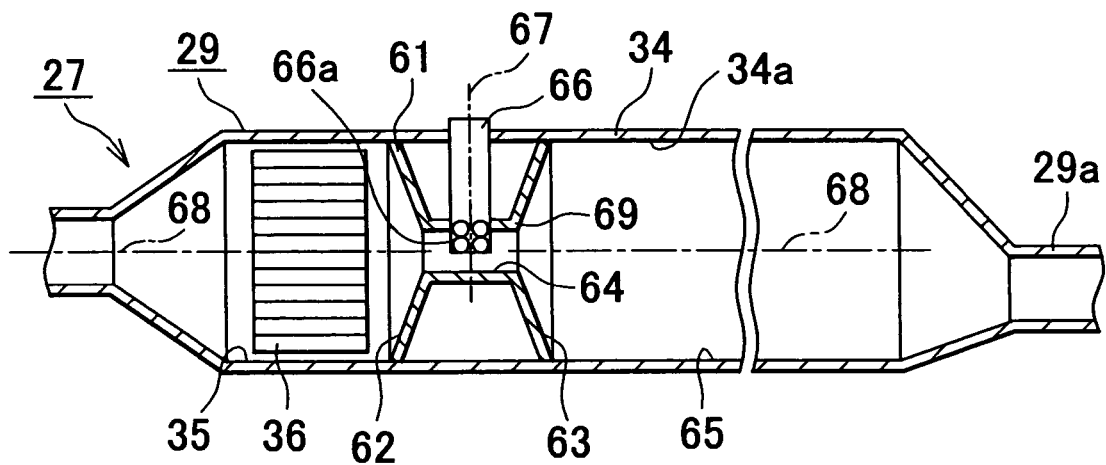
FIG. 11 is a fragmentary sectional view of an internal structure of a main muffler in a fourth embodiment.

A fourth embodiment of the invention will next be described with reference to FIG. 11. In the fourth embodiment, a main muffler 29 is provided with a sensor 66 that contacts exhaust gas and detects information regarding the exhaust gas. Examples of the sensor 66 include an oxygen sensor that detects the concentration of oxygen in exhaust gas, an exhaust temperature sensor that detects the temperature of exhaust gas, a NOx sensor that detects nitrogen oxides NOx in exhaust gas, etc. The sensor 66 is disposed so that an axis 67 of the sensor 66 is perpendicular to a center line 68 of an external cylinder 34. The sensor 66 extends through at last an inner wall 69 of a separator 61. A major portion of the sensor 66 is located in an internal space of the separator 61. A detection portion 66a provided at a distal end of the sensor 66 is protruded into a central hole portion 64. The sensor 66 is fixed to the separator 61, at least at the inner wall 69 thereof. If the sensor 66 is elongated as shown in FIG. 11, the sensor 66 may extend through the external cylinder 34 as well as the inner wall 69 of the separator 61. If the sensor 66 is short (not shown), the sensor 66 may extend through only the inner wall 69. Except for the above-described construction, the fourth embodiment has substantially the same construction as the third embodiment. Therefore, components of the fourth embodiment comparable to those of the third embodiment are represented by comparable reference characters in FIG. 11, and are not described in detail.

According to the above-described exhaust pipe structure 27, when exhaust gas collected along the tapered upstream-side wall surface 62 toward the central hole portion 64 of the separator 61 passes through the central hole portion 64, the exhaust gas contacts the detection portion 66a of the sensor 66. Thus, a characteristic of the exhaust gas is detected by the sensor 66. For example, if the sensor 66 is an oxygen sensor, the concentration of oxygen in exhaust gas is detected. If the sensor 66 is an exhaust temperature sensor, the temperature of the exhaust gas is detected. If the sensor 66 is a NOx sensor, nitrogen oxides NOx in exhaust gas is detected.

Therefore, the fourth embodiment achieves the following advantages, in addition to the aforementioned advantages (1) to (12) and the advantages (15) and (16).

(17) The sensor 66 is attached to the separator 61, with the detection portion 66a being protruded into the central hole portion 64 of the separator 61. Therefore, if a characteristic of exhaust gas, such as concentration, exhaust gas temperature, etc., greatly varies in directions of diameter of the external cylinder 34 (the top-bottom direction in FIG. 11), the characteristic of exhaust gas can be substantially uniformed as the exhaust gas is collected toward the central hole portion 64 of the separator 61. Since the detection portion 66a is disposed in the central hole portion 64, it becomes possible to detect the target characteristic concerned with reduced variation and improved precision.

(18) If the separator 61 were not employed and the sensor 66 were fixed to only the external cylinder 34, the sensor 66 would need to have a length that is greater than or equal to the radius of the external cylinder 34, in order to locate the detection portion 66a in a central portion of the external cylinder 34. In the fourth embodiment, the sensor 66 is fixed at least to the inner wall 69 of the separator 61. Therefore, the sensor 66 does not need to have a length that is greater than or equal to the radius of the external cylinder 34. Hence, it is not necessary to use a specially large (long) sensor in order to locate the detection portion 66a in a central portion of the external cylinder 34. That is, if the sensor is relatively short, the sensor can be mounted with the detection portion 66a being located in the central hole portion 64.

Fifth Embodiment

A fifth embodiment of the invention will next be described with reference to FIG. 12. In the fifth embodiment, a bracket 44 is provided on an outside surface of a portion of the external cylinder 34 that corresponds to a separator 61. The construction of the bracket 44 is substantially the same as the construction described above in conjunction with the first embodiment. Except for the above-described construction, the fifth embodiment has substantially the same construction as the third embodiment. Therefore, members of the fifth embodiment comparable to those of the third embodiment are represented by comparable reference characters in FIG. 12, and are not described in detail again.

According to the exhaust pipe structure 27, the main muffler 29 is elastically supported by the floor 12 while hanging from the floor 12, via the bracket 44, the connector member 54, the vehicle body-side bracket 53, etc. (see FIG. 5). Elastic deformation of the connector member 54 absorbs deformation caused by heat of exhaust gas, changes of the mounting position caused by vibration produced in the vehicle body, the engine 26, etc.

Since the gas in the hollow separator 61 achieves a heat insulation effect, transfer of heat of exhaust gas to the outside of the external cylinder 34 via the separator 61 is less likely. In the fifth embodiment, since the bracket 44 is provided on the outside of a portion of the external cylinder 34 that corresponds to the separator 61, transfer of exhaust gas heat to the bracket 44 or the connector member 54 is less likely.

The fifth embodiment achieves the following advantages, in addition to the advantages (1) to (12), and (15) and (16).

(19) Taking into account the heat insulating effect of the air present in the hollow separator 61, the bracket 44 is provided on the outside of a portion of the external cylinder 34 corresponding to the separator 61. Therefore, it is possible to curb rise in the temperature of the bracket 44 and the connector member 54 due to radiation and conduction of heat from exhaust gas. Hence, it becomes possible to dispose the connector member 54 closer to the external cylinder 34 while securing heat resistance of the connector member 54. Thus, the bracket 44 can be reduced in size.

Sixth Embodiment

Figure 13:
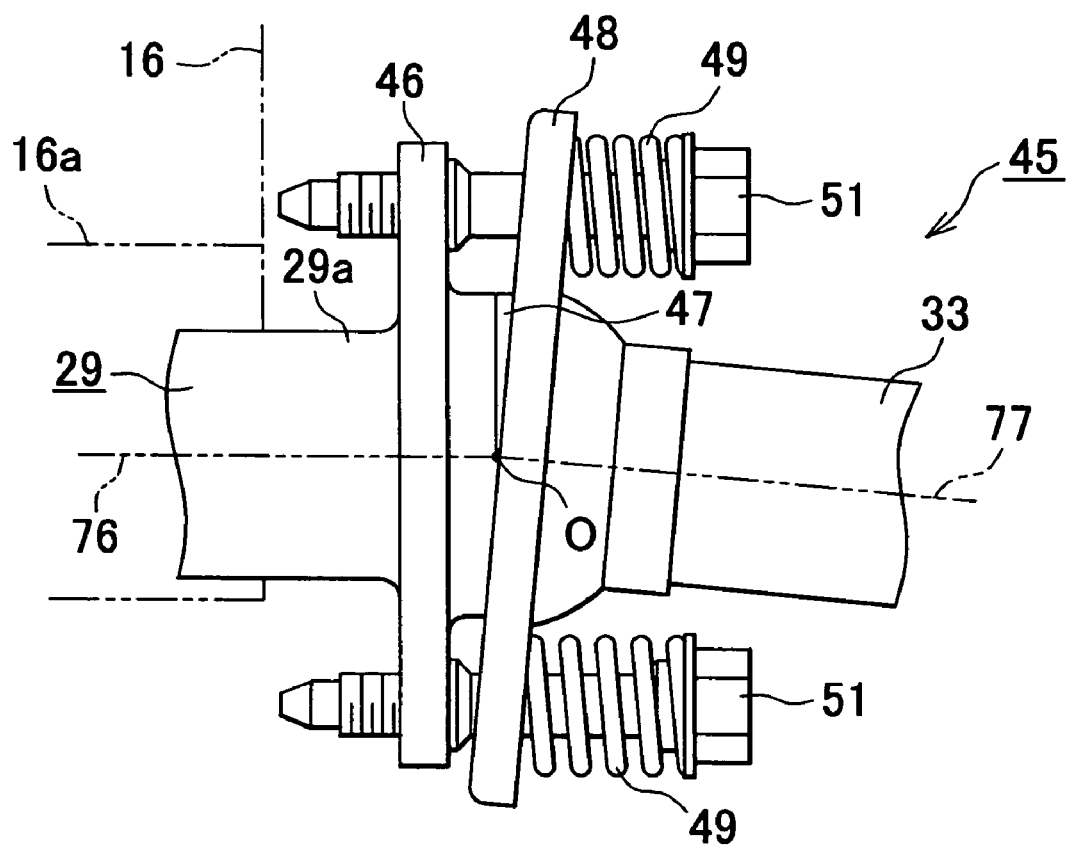
FIG. 13 is a side view of a ball joint mechanism in a sixth embodiment.

A sixth embodiment of the invention will next be described with reference to FIG. 13. In the sixth embodiment, a pipe portion 29a of a main muffler 29 and a downstream-side exhaust pipe 33 are joined so that their center axes 76, 77 intersect with each other. If the main muffler 29 and the downstream-side exhaust pipe 33 are disposed collinearly, that is, if the both center axes 76, 77 do not intersect with each other, there is a possibility that the main muffler 29 and the downstream-side exhaust pipe 33 may fail to pivot about a spherical center O of a concave surface 48a when load occurs in the direction of the axis. In that case, the ball joint mechanism 45 does not deliver full performance of vibration absorption. Except for the above-described construction, the sixth embodiment has substantially the same construction as the first embodiment. Therefore, components of the sixth embodiment comparable to those of the first embodiment are represented by comparable reference characters in FIG. 13, and are not described in detail again.

Therefore, the sixth embodiment achieves the following advantages, in addition to the advantages (1) to (13).

(20) Since the main muffler 29 and the downstream-side exhaust pipe 33 are disposed so that the center axes 76, 77 thereof intersect with each other, the relative pivoting of the two members about the spherical center O of the concave surface 48a becomes easy. Therefore, if load occurs in the direction of axis, the ball joint mechanism 45 more readily changes its shape. Thus, the vibration absorption capability improves.

Seventh Embodiment

Figure 14:
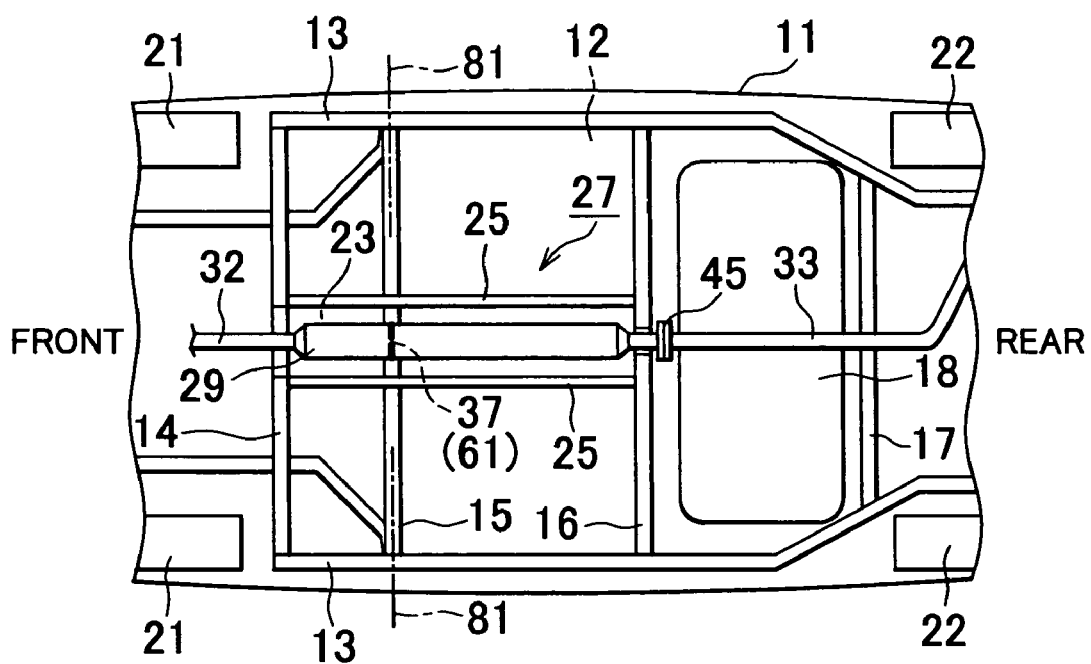
FIG. 14 is a fragmentary bottom view of a structure of a lower portion of a vehicle in a seventh embodiment.

A seventh embodiment of the invention will next be described with reference to FIG. 14. In the seventh embodiment, a separator 37 (or 61) dividing the interior of an external cylinder 34 into two spaces in the direction of length is located on or near an axis 81 of a cross member that intersects with a main muffler 29. The cross member may be an existing member (cross member 15), or may be a newly provided member. Except for the above-described construction, the seventh embodiment has substantially the same construction as the first embodiment. Hence, components of the seventh embodiment comparable to those of the first embodiment are represented by comparable reference characters in the FIG. 14, and are not described in detail again.

According to the above-described exhaust pipe structure 27, if the vehicle 11 receives a sideway impact, a portion of the impact is transmitted to the main muffler 29 via the cross member 15. A portion of the main muffler 29 corresponding to the cross member 15 is provided with the separator 37 (or 61), so that the rigidity of that portion is enhanced by the separator 37 (or 61). Therefore, the impact is received and borne by the separator 37 (or 61).

The seventh embodiment achieves the following advantage in addition to the advantages (1) to (13).

(21) In the external cylinder 34, the separator 37 (or 61) is provided on or near the axis 81 of the cross member 15, thereby enhancing the rigidity of a portion of the external cylinder 34 corresponding to the cross member 15. Therefore, if an impact occurs sideway on the vehicle 11, and is transmitted to the external cylinder 34 via the cross member 15, the impact can be received and borne by the separator 37 (or 61). Thus, the impact resistance can be improved.

Eighth Embodiment

Figure 15:
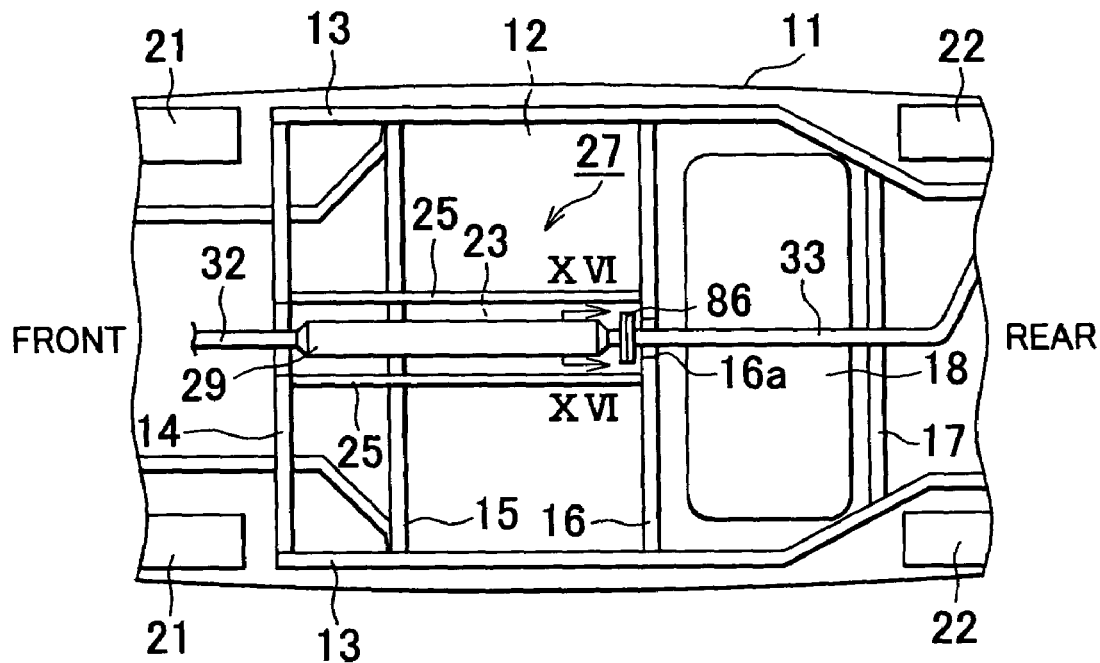
FIG. 15 is a fragmentary bottom view of a structure of a lower portion of a vehicle in an eighth embodiment.
Figure 16:
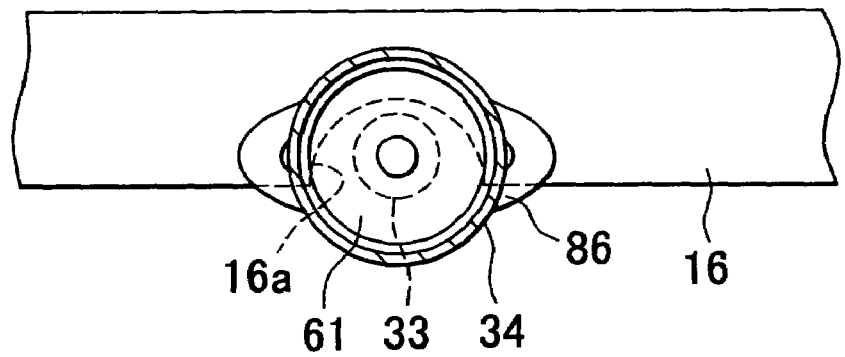
FIG. 16 is an enlarged sectional view taken on line XVI-XVI in FIG. 15.

An eighth embodiment of the invention will next be described with reference to FIGS. 15 and 16. In the eighth embodiment, a cross member 16 is disposed rearward of a joint 86 that connects a main muffler 29 and a downstream-side exhaust pipe 33 and, more specifically, is disposed between the joint 86 and a fuel tank 18. The downstream-side exhaust pipe 33 is disposed so as to extend through a cutout 16a that is formed in the cross member 16. Due to this arrangement, at least a portion of the cross member 16 is at the same height as the joint 86. As for the joint 86, it is possible to employ a device similar to the vibration absorption mechanism (ball joint mechanism 45) employed in the first embodiment. It is to be noted that the floor 12 is not shown in FIG. 16. Except for the above-described construction, the eighth embodiment has substantially the same construction as the first embodiment. Therefore, components of the eighth embodiment comparable to those of the first embodiment are represented by comparable reference characters in FIGS. 15 and 16, and are not herein described in detail.

According to the above-described exhaust pipe structure 27, the joint 86 is located forward of the cross member 16. Furthermore, at least a portion of the cross member 16 is at the same height as the joint 86. That is, the cross member 16 and the joint 86 overlap with each other in the direction of height. Therefore, even if an impact occurs on the vehicle 11 from the front so that a load toward the rear occurs on the exhaust pipe structure 27, the load is received and borne by impingement of the joint 86 on the cross member 16.

Therefore, the eighth embodiment achieves the following advantages in addition to the advantages (1) to (8), and (10), (12) and (13).

(22) The cross member 16 is disposed between the joint 86 and the fuel tank 18. Furthermore, at least a portion of the cross member 16 is at the same height as the joint 86. Therefore, even if an impact occurs on the vehicle 11 from the front, the load caused by the impact is received and borne by the joint 86 impinging on the cross member 16. Thus, the embodiment substantially prevents the contact of the main muffler 29 having high temperature with the fuel tank 18.

Ninth Embodiment

Figure 17:
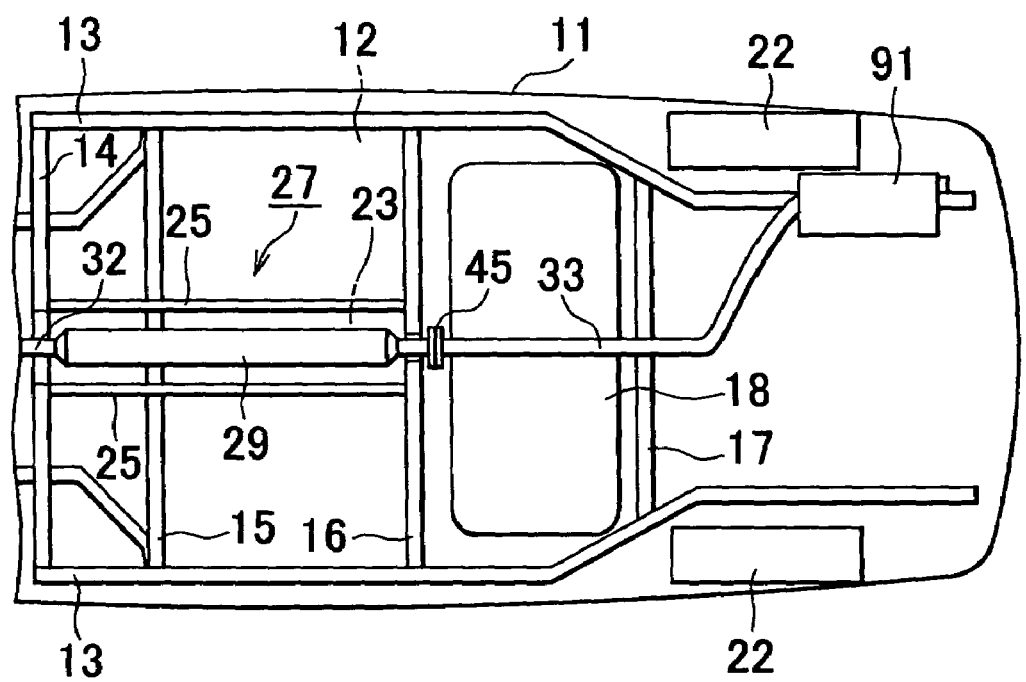
FIG. 17 is a fragmentary bottom view of a structure of a lower portion of a vehicle in a ninth embodiment.

A ninth embodiment of the invention will next be described with reference to FIG. 17. In the ninth embodiment, a subsidiary muffler 91 is disposed downstream of a main muffler 29 on the exhaust passage, for example, near an inward side of a rear wheel 22. The subsidiary muffler 91 has a smaller muffler capacity than the main muffler 29. The subsidiary muffler 91 may be, for example, a straight muffler of a sound absorption type, a resonance type, etc. Except for the above-described construction, the ninth embodiment has substantially the same construction as the first embodiment. Therefore, components of the ninth embodiment comparable to those of the first embodiment are represented by comparable reference characters in the FIG. 17, and are not described in detail again.

According to the above-described exhaust pipe structure 27, exhaust gas produced in association with operation of the engine 26 passes through the exhaust passage in the order of main muffler 29, the downstream-side exhaust pipe 33 and the subsidiary muffler 91. Therefore, the exhaust noise is attenuated by the subsidiary muffler 91 in addition to the main muffler 29.

Therefore, the ninth embodiment achieves the following advantages in addition to the advantages (1), (2), and (4) to (13).

(23) In the exhaust passage, the subsidiary muffler 91 is disposed downstream of the main muffler 29, so that the subsidiary muffler 91 assists the main muffler 29 in attenuation of exhaust noise. Therefore, the muffler capacity of the main muffler 29 can be reduced by an amount corresponding to the assist from the subsidiary muffler 91, for a fixed level of attenuation of exhaust noise. Hence, the main muffler 29 can be reduced in size.

Furthermore, since the muffler capacity of the subsidiary muffler 91 is smaller than that of the conventional main muffler, the addition of the subsidiary muffler 91 does not considerably affect the reduced-height design of the rear floor.

Tenth Embodiment

Figure 18:
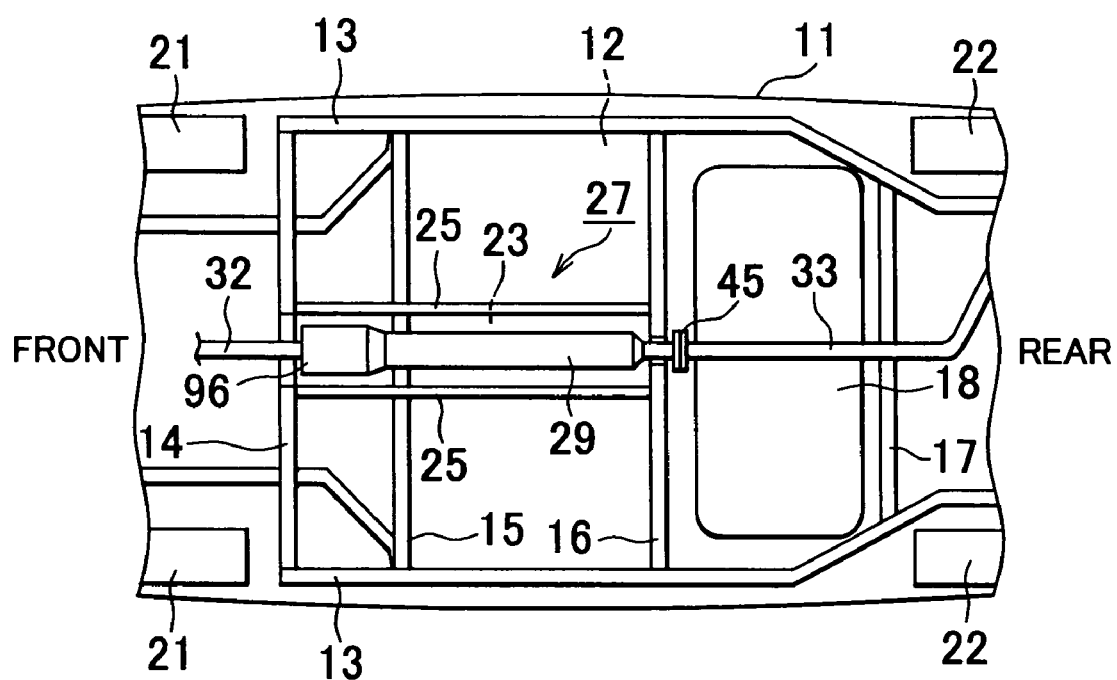
FIG. 18 is a fragmentary bottom view of a structure of a lower portion of a vehicle in a tenth embodiment.

A tenth embodiment of the invention will next be described with reference to FIG. 18. In the tenth embodiment, a catalytic converter 36 is not disposed within a main muffler 29, but an under-floor catalyst 96 as a catalytic converter is provided separately from the main muffler 29. The under-floor catalyst 96 is disposed in a forward portion of a tunnel portion 23. The main muffler 29 is disposed within the tunnel portion 23 so that a front end portion of the main muffler 29 is located immediately rearward of the under-floor catalyst 96. For connection between the under-floor catalyst 96 and the main muffler 29, it is desirable to avoid the use of an exhaust pipe. For example, the main muffler 29 may be directly joined to a rear portion of the case of the under-floor catalyst 96 by welding or the like. Furthermore, the rear portion of the case may have a tapered portion that progressively reduces in diameter toward the rear end. A small-diameter portion of the tapered portion may be directly joined to the main muffler 29 by welding or the like. Except for the above-described construction, the tenth embodiment has substantially the same construction as the first embodiment. Therefore, components of the tenth embodiment comparable to those of the first embodiment are represented by comparable reference characters in FIG. 18, and are not described in detail again.

According to the above-described exhaust pipe structure 27, exhaust gas is purified when passing through the under-floor catalyst 96. After passing through the under-floor catalyst 96, the purified exhaust gas immediately flows into the main muffler 29. The noise of exhaust gas is attenuated during the passage through the main muffler 29.

Therefore, the tenth embodiment achieves the following advantages in addition to the advantages (1) to (11), and (13).

(24) The front end of the main muffler 29 disposed within the tunnel portion 23 is located immediately rearward of the under-floor catalyst 96 disposed in a forward portion of the tunnel portion 23. Therefore, assuming that the rear end portion of the main muffler 29 is at a predetermined position, the main muffler 29 is provided with a greater length in the tenth embodiment than a case where the front end portion of the main muffler 29 is located in an intermediate portion of the tunnel portion 23. If the main muffler 29 has an increased length, the diameter of the main muffler 29 can be reduced accordingly while a required muffler capacity is secured. Therefore, the tenth embodiment is effective in reducing the diameter of the tunnel portion 23.

Furthermore, since the main muffler 29 is disposed immediately rearward of the under-floor catalyst 96, the rigidity increases, and the vibration resistance of the connecting portion between the main muffler 29 and the under-floor catalyst 96 can be enhanced.

The invention can be carried out in still other embodiments as described below.

Although in the foregoing embodiments, the external cylinder 34 of the main muffler 29 has a circular sectional shape, the external cylinder may instead have a non-circle sectional shape while having a sectional area substantially equal to the area (i.e., $2500\pi$ mm$^2$ to $5625\pi$ mm$^2$) of the circular section of the circular sectional shape main muffler 29. Examples of the non-circle sectional shape include an elliptical shape, a polygonal shape, etc.

The construction of the ball joint mechanism 45 may be changed to a construction in which the seal ring 47 is disposed on the downstream-side exhaust pipe 33, and the seal seat 48 is attached to the pipe portion 29a of the main muffler 29.

Figure 19:
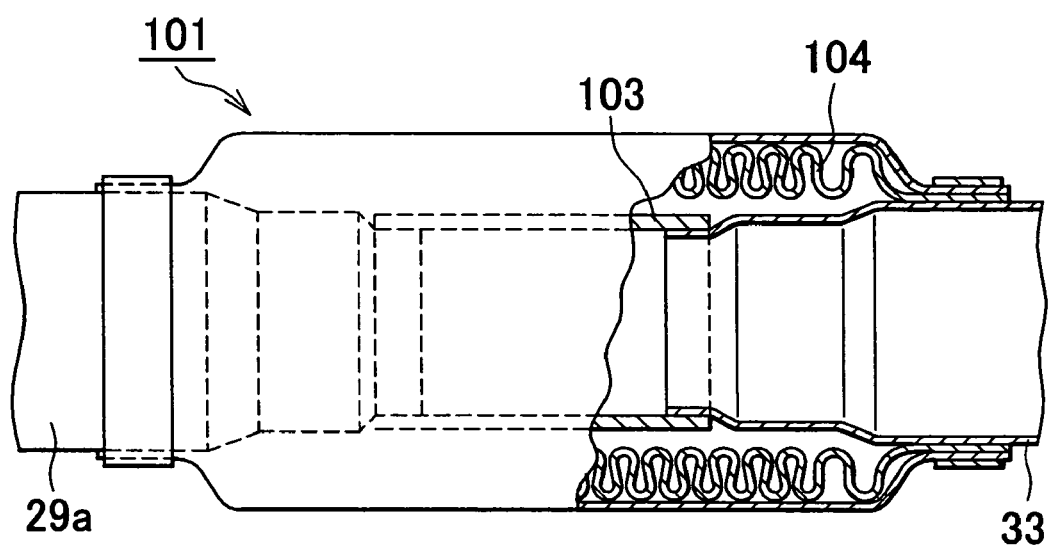
FIG. 19 is a partially cutaway side view of a flexible joint mechanism in accordance with another embodiment of the vibration absorption mechanism.

As for the vibration absorption mechanism, the ball joint mechanism 45 may be replaced by a flexible joint mechanism 101 shown in FIG. 19. In the flexible joint mechanism 101, the pipe portion 29a (rear portion) of the main muffler 29 and the downstream-side exhaust pipe 33 are connected by a connecting pipe 103 that is formed of an elastic material. The connecting pipe 103 is surrounded by a bellows member 104. Thus, the main muffler 29 and the downstream-side exhaust pipe 33 are movably connected. Vibration transmitted between the main muffler 29 and the downstream-side exhaust pipe 33 is absorbed due to elasticity of the bellows member 104.

In the first embodiment, it is appropriate that at least a portion of the rear end portion of the main muffler 29 be at the same height as the cross member 16. Therefore, the main muffler 29 does not altogether need to be parallel to the tunnel portion 23, but may be disposed in a vertically inclined posture relative to the tunnel portion 23.

As for the separator 61 in the third to fifth embodiments, it is appropriate that the upstream-side wall surface 62 inclines so that downstream portions of the wall surface are closer to the center. Therefore, the upstream-side wall surface 62 does not always need to be a taper surface, but may be, for example, the group of side faces of a pyramid, such as a quadrangular pyramid and the like, that is, may be formed by a group of flat surfaces.

The vehicles to which the exhaust pipe structure of an embodiment of the invention is applicable are low-floor vehicles among sedans, station wagons, hatch backs, mini-vans, etc.

An essential construction requirement of the first embodiment is that only the long and narrow main muffler 29 having the aforementioned diameter D and the aforementioned length L be employed as a muffler. Other components of the first embodiment may be suitably omitted. The omission of components may be similarly accomplished in the second and other embodiments, which are partially modified from the first embodiment.

What is claimed is:

1. An exhaust pipe structure comprising:
    an exhaust passage for exhaust gas discharged from a vehicle-installed engine that is provided below a floor of a vehicle;
    at least one muffler provided on an intermediate portion of the exhaust passage,
    wherein the at least one muffler includes an only one main muffler having the greatest muffler capacity among the at least one muffler,
    wherein the main muffler has an external cylinder forming an outer shell portion of the main muffler,
    wherein the external cylinder has a circular sectional shape having a diameter of 100 mm to 150 mm, or a sectional shape that is substantially equal to an area of the circular sectional shape, and the external cylinder has a length of 800 mm to 1200 mm, and
    wherein the only one main muffler is disposed in the same exhaust passage as the at least one muffler,
    a downstream-side exhaust pipe located downstream of the main muffler,
    a joint connecting the main muffler and the downstream-side exhaust pipe,
    wherein the joint is formed by a vibration absorption mechanism that is provided between the main muffler and the downstream-side exhaust pipe and that absorbs a vibration transmitted between the main muffler and the downstream-side exhaust pipe, by deformation of the joint, and
    a catalytic converter provided integrally with the main muffler not via an exhaust pipe.

2. The exhaust pipe structure according to claim 1, wherein a tunnel portion that extends in a longitudinal direction relative to the vehicle is provided in the floor between a front wheel and a rear wheel, and the main muffler is disposed in the tunnel portion.

3. The exhaust pipe structure according to claim 1,
    wherein a first cross member that forms a portion of a frame of the vehicle and that extends in a transverse direction relative to the vehicle is disposed at a site between the main muffler and the joint.

4. The exhaust pipe structure according to claim 1,
    wherein the vibration absorption mechanism comprises a seal ring provided on one of a rear end portion of the main muffler and the downstream-side exhaust pipe, and a seal seat that is provided on another one of the rear end portion of the main muffler and the downstream-side exhaust pipe, and that has a spherical concave surface that slidably contacts the seal ring, and
    wherein the main muffler and the downstream-side exhaust pipe are disposed so that a center axis of the main muffler and a center axis of the downstream-side exhaust pipe intersect with each other.

5. The exhaust pipe structure according to claim 1, wherein the main muffler is formed by an expansion muffler.

6. The exhaust pipe structure according to claim 1, wherein the catalytic converter is disposed in a forward portion of the tunnel portion for controlling emissions.

7. The exhaust pipe structure according to claim 1, further comprising an accommodation chamber that is formed in a front end portion of the main muffler and that contains the catalytic converter.

8. The exhaust pipe structure according to claim 2, wherein the main muffler is disposed in the tunnel portion so that a front end portion of the main muffler is located in a forward portion of the tunnel portion.

9. The exhaust pipe structure according to claim 2, wherein a reinforcement member is provided along an axial direction of the tunnel portion, on a lower surface of the floor near a side of the tunnel portion.

10. The exhaust pipe structure according to claim 2, wherein a fuel tank is disposed rearward of the tunnel portion of the floor, and a first cross member forming a portion of a frame of the vehicle and extending in a transverse direction relative to the vehicle is disposed between the main muffler and the fuel tank.

11. The exhaust pipe structure according to claim 10, wherein the main muffler is disposed so that at least a portion of a rear end portion of the main muffler is at the same height as the first cross member.

12. The exhaust pipe structure according to claim 3, wherein the main muffler is disposed so that at least a portion of a rear end portion of the main muffler is at the same height as the first cross member.

13. The exhaust pipe structure according to claim 12, further comprising:
    a downstream-side exhaust pipe located downstream of the main muffler; and a joint connecting the main muffler and the downstream-side exhaust pipe,
    wherein the a fuel tank is disposed rearward of the tunnel portion of the floor, and
    wherein the first cross member is located between the fuel tank and the joint, and is disposed so that at least a portion of the first cross member is at the same height as the joint.

14. The exhaust pipe structure according to claim 13, wherein the joint is formed by a vibration absorption mechanism that is provided between the main muffler and the downstream-side exhaust pipe and that absorbs a vibration transmitted between the main muffler and the downstream-side exhaust pipe, by deformation of the joint.

15. The exhaust pipe structure according to claim 5, further comprising a separator that is formed by a hollow annular body and that is provided along an inner wall surface of the external cylinder,
    wherein an upstream-side wall surface of the separator is inclined so that further downstream portions of the upstream-side wall surface are closer to a center of the external cylinder.

16. The exhaust pipe structure according to claim 7, wherein the main muffler comprises:
    an inlet-side exhaust conduit which is disposed within the external cylinder and whose upstream end is communicatively connected to the accommodation chamber and whose downstream end is open and located in a rearward portion of the external cylinder; and
    an outlet-side exhaust conduit whose upstream end is open and located in the external cylinder near the accommodation chamber, and whose downstream end is connected to the rearward portion of the external cylinder.

17. An exhaust pipe structure comprising:
    an exhaust passage for exhaust gas discharged from a vehicle-installed engine that is provided below a floor of a vehicle;

at least one muffler provided on an intermediate portion of the exhaust passage, wherein the at least one muffler includes an only one main muffler having the greatest muffler capacity among the at least one muffler, wherein the main muffler has an external cylinder forming an outer shell portion of the main muffler, wherein the external cylinder has a sectional area perpendicular to a direction of an axis of the external cylinder which is in a range of $2500\pi$ mm$^2$ to $5625\pi$ mm$^2$, and the external cylinder has a length in a range of 800 mm to 12000 mm, and wherein the only one main muffler is disposed in the same exhaust passage as the at least one muffler.

a downstream-side exhaust pine located downstream of the main muffler, a joint connecting the main muffler and the downstream-side exhaust pipe, wherein the joint is formed by a vibration absorption mechanism that is provided between the main muffler and the downstream-side exhaust pipe and that absorbs a vibration transmitted between the main muffler and the downstream-side exhaust pipe, by deformation of the joint, and a catalytic converter provided integrally with the main muffler not via an exhaust pipe.

\* \* \* \* \*

UNITED STATES PATENT AND TRADEMARK OFFICE
CERTIFICATE OF CORRECTION

PATENT NO. : 7,383,912 B2  
APPLICATION NO. : 10/681095  
DATED : June 10, 2008  
INVENTOR(S) : Tadashi Kondo et al.

Page 1 of 1

It is certified that error appears in the above-identified patent and that said Letters Patent is hereby corrected as shown below:

| Column | Line | |
|---|---|---|
| 4 | 31 | After "corresponds" insert --to--. |
| 7 | 47 | Change "relatively to" to --relative to--. |
| 8 | 60 | Before "generally" delete "a". |
| 15 | 52 | Change "at last" to --at least--. |
| 17 | 27 | Delete "both". |
| 18 | 13 | Change "sideway" to --sideways--. |
| 22 | 27 | Change "claim 12" to --claim 11--. |
| 22 | 32 | Change "the a fuel tank" to --the fuel tank--. |
| 23 | 14 | After "muffler" insert --,--. |
| 24 | 1 | Change "exhaust pine" to --exhaust pipe--. |

Signed and Sealed this

Twelfth Day of May, 2009

JOHN DOLL  
*Acting Director of the United States Patent and Trademark Office*